United States Patent
Gilron et al.

(10) Patent No.: US 8,137,539 B2
(45) Date of Patent: Mar. 20, 2012

(54) METHOD AND SYSTEM FOR INCREASING RECOVERY AND PREVENTING PRECIPITATION FOULING IN PRESSURE-DRIVEN MEMBRANE PROCESSES

(75) Inventors: Jack Gilron, Beer-Sheva (IL); Eliyahu Korin, Beer-Sheva (IL)

(73) Assignee: Ben-Gurion University of the Negev Research and Development Authority, Beer-Sheva (IL)

(*) Notice: Subject to any disclaimer, the term of this patent is extended or adjusted under 35 U.S.C. 154(b) by 822 days.

(21) Appl. No.: 10/581,515

(22) PCT Filed: Dec. 7, 2004

(86) PCT No.: PCT/IL2004/001110
§ 371 (c)(1),
(2), (4) Date: Apr. 22, 2008

(87) PCT Pub. No.: WO2005/053824
PCT Pub. Date: Jun. 16, 2005

(65) Prior Publication Data
US 2008/0230476 A1    Sep. 25, 2008

Related U.S. Application Data

(60) Provisional application No. 60/529,668, filed on Dec. 7, 2003, provisional application No. 60/621,014, filed on Oct. 22, 2004.

(51) Int. Cl.
*B01D 61/10* (2006.01)
(52) U.S. Cl. .... 210/96.2; 210/108; 210/134; 210/257.2; 210/258; 210/259; 210/321.69

(58) Field of Classification Search .................. 159/47.1; 210/85, 96.2, 108, 138, 139, 258, 259, 321.65, 210/321.66, 321.69, 424, 636, 638, 639, 210/650, 652, 739, 746, 774, 806, 181, 195.1, 210/195.2, 702, 805, 134, 257.2; 700/273; 23/295 R, 296
See application file for complete search history.

(56) References Cited

U.S. PATENT DOCUMENTS
4,176,057 A    11/1979 Wheatley et al.
(Continued)

FOREIGN PATENT DOCUMENTS
RU    2207987    8/2002
WO    94/29007    12/1994

OTHER PUBLICATIONS
Nemeth, "Innovative System Designs to Optimize Performance of Ultra-low Pressure Reverse Osmosis Membranes", Desalination, vol. 118, 1998, pp. 63-71.
(Continued)

*Primary Examiner* — Joseph Drodge
(74) *Attorney, Agent, or Firm* — Nixon & Vanderhye P.C.

(57) ABSTRACT

The invention provides a process for purifying water containing soluble species capable of forming one or more sparingly soluble salts or minerals, said process comprising feeding a pressurized water stream into a treatment zone having one or more membranes disposed therein, passing said stream along said membrane(s) to recover a permeate and to withdraw a concentrate therefrom while periodically reversing the direction of the flow of said stream in said treatment zone, wherein the periodicity of the flow reversal is such that said one or more membranes are exposed to supersaturation conditions evolving in said water stream for a period of time which is less then the time required for said supersaturated water stream to precipitate one or more of said sparingly soluble salts and/or minerals therefrom.

12 Claims, 7 Drawing Sheets

U.S. PATENT DOCUMENTS

| | | | | |
|---|---|---|---|---|
| 4,318,772 | A | * | 3/1982 | Kragh .......................... 210/712 |
| 4,574,049 | A | * | 3/1986 | Pittner ......................... 210/639 |
| 5,415,781 | A | * | 5/1995 | Randhahn et al. ........... 210/650 |
| 5,690,829 | A | | 11/1997 | Lauer |
| 5,814,224 | A | * | 9/1998 | Khamizov et al. ........... 210/638 |
| 6,036,867 | A | * | 3/2000 | Jogand et al. ................ 210/696 |
| 6,054,050 | A | * | 4/2000 | Dyke ........................... 210/639 |
| 6,099,733 | A | | 8/2000 | Haney |
| 6,168,714 | B1 | * | 1/2001 | Ilias et al. ................ 210/321.69 |
| 6,432,310 | B1 | * | 8/2002 | Andou et al. ................ 210/636 |
| 6,468,389 | B1 | * | 10/2002 | Harris et al. ................ 159/47.1 |
| 6,508,936 | B1 | | 1/2003 | Hassan |
| 6,730,227 | B2 | * | 5/2004 | Zeiher et al. ................ 210/650 |
| 6,838,001 | B2 | * | 1/2005 | Zeiher et al. ................ 210/639 |

OTHER PUBLICATIONS

Breslau et al., "Advances in Hollow Fiber Ultrafiltration Technology", Ultrafiltration Membranes and Applications, Polymer Science and Technology, Plenum Press, vol. 13, pp. 109-127.

Mallevialle et al., editors, Section 9.4 in "Water Treatment Membrane Processes" McGraw-Hill, 1996, pp. 9.16-9.55.

Hasson et al. "Induction Times Induced in an RO System by Antiscalants Delaying $CaSO_4$ Precipitation", Desalination, vol. 157, 2003, pp. 193-207.

Alimi et al., "Kinetics of the Precipitation of Calcium Sulfate Dihydrate in a Desalination Unit", Desalination, vol. 157, 2003, pp. 9-16.

He et al., "The Nucleation Kinetics of Calcium Sulfate Dihydrate in NaCl Solutions up to 6 $m$ and 90° C.", Journal of Colloid and Interface Science, vol. 162, 1994, pp. 297-303.

Hasson et al., "Inception of $CaSO_4$ Scaling on RO Membranes at Various Water Recovery Levels", Desalination, vol. 139, 2001, pp. 73-81.

Hargrove et al., "Flux Enhancement Using Flow Reversal in Ultrafiltration" Separation Science and Technology, vol. 34, pp. 1319-1331, 1999.

International Search Report for PCT/IL04/01110 dated May 27, 2005.

* cited by examiner

METHOD AND SYSTEM FOR INCREASING RECOVERY AND PREVENTING PRECIPITATION FOULING IN PRESSURE-DRIVEN MEMBRANE PROCESSES

This application is a 371 of International Application PCT/IL04/01110, filed on 7 Dec. 2004, which designated the U.S. and claims benefit of U.S. Provisional Application Nos. 60/529,668, filed Dec. 7, 2003, and 60/621,014 filed 22 Oct. 2004, the entire contents of each of which are hereby incorporated by reference.

FIELD OF THE INVENTION

The present invention generally relates to improving the recovery, and to prevention of precipitation fouling, in liquid filtration processes. More particularly, the invention relates to a method and system for preventing precipitation fouling in reverse osmosis and nanofiltration pressure-driven filtration processes, and for increasing recovery by precipitation of supersaturated minerals from the concentrate stream prior to its further desalination.

BACKGROUND OF THE INVENTION

Membrane filtration processes provide attractive solutions for various water treatment applications such as used for the removal of inorganic constituents and in particular in desalting brackish water and seawater and for the removal of Synthetic Organic Chemicals (SOC). Since traditional water treatment methods are not always able to meet the requirements imposed by the drinking water regulations, membrane filtration processes are becoming preferable in such applications, particularly due to their small space requirement and efficient removal of contaminants.

Pressure-driven membrane processes are defined as processes in which the feed stream is fed at a volumetric rate $Q_f$ into a membrane device (e.g., pressure vessel) equipped with membranes that divide the device space into a feed side and a permeate side, and in which a pressure difference across the membranes causes the solvent (usually water) to pass from the feed space to the permeate space at a volumetric rate denoted as $Q_p$. The remaining solution which is now concentrated in the rejected solutes, leaves the feed space of the membrane device as a concentrate stream at a volumetric rate denoted as $Q_r$. The fraction of feed that leaves the membrane device as permeate is referred to as the membrane recovery, Y:

$$Y \equiv \frac{Q_p}{Q_f} \quad (1)$$

As recovery is increased the concentration of rejected solutes in the concentrate stream, $C_r$, is given by mass balance as:

$$C_r = C_f \frac{1 - Y(1 - R)}{1 - Y} \quad (2)$$

Pressure-driven membrane processes are distinguished from each other by the types of solutes they reject or pass to the permeate side. For a given process this selectivity can be defined by the empirical solute rejection for each solute i, $R_i$, defined by:

$$R_i \equiv \frac{C_{f,i} - C_{p,i}}{C_{f,i}} = 1 - \frac{C_{p,i}}{C_{f,i}} \quad (3)$$

Where $C_{f,i}$, $C_{p,i}$ refer to the feed and permeate concentrations respectively of component i. For highly rejected species, $R_i \cong 1$ and then the relation defined in equation 2, between its concentration in the concentrate stream, $C_r$, and the recovery, Y reduces to:

$$C_r = C_f \frac{1}{1 - Y}, \text{ where } R = 1 \quad (4)$$

Typical definitions of the various types of pressure driven processes are provided in table 1:

TABLE 1

Definition of various pressure driven membrane processes, adapted from M. Mulder, Basic Membrane Technology, 2$^{nd}$ ed., Ch. 1 (Marcel Dekker, 1996).

| Membrane process | Solutes rejected | Water permeability range (L/m²-h-bar) |
| --- | --- | --- |
| microfiltration (MF) | $d_p > 0.1$-1 µm | 50< |
| ultrafiltration (UF) | MWCO > 1000-250,000 | 10< |
| nanofiltration (NF) | multivalent ions, MWCO > 200-1000 | 2-20 |
| reverse osmosis (RO) | monovalent ions | 0.05-7 |

In this table $d_p$ refers to the diameter of the solute rejected. MWCO refers to the molecular weight cutoff usually defined as the molecular weight of the solute which is 90% or more rejected by the membrane. It can be seen that the pressure-driven membrane processes that will result in partial or complete desalination are reverse osmosis (RO) and nanofiltration (NF). They will also remove natural organic matter, synthetic organic matter, and inorganic chemicals, and thus they are suitable for partial or complete desalting of brackish and sea water.

The rate at which solvent together with non-rejected solutes passes through the membrane per unit membrane area is defined as the membrane flux (denoted $J_v$) with units of volume/(unit area-time). During the filtration process the membranes become fouled and as a result less effective. Membrane fouling has become one of the primary impediments to their acceptance in water treatment applications. The occurrence of membrane fouling in reverse osmosis and nanofiltration processes leads to reduction in the production rate and sometimes to loss of solute rejection. There are several kinds of fouling which typically occur in such processes:

colloidal fouling;
  organic fouling (adsorption of soluble organics on membrane surface);
  biofouling—formation of a biofilm which by itself or in concert with other kinds of fouling causes deterioration of membrane performance; and
  precipitation fouling (or scaling) due to precipitation of sparingly soluble salts and minerals.

Common methods for preventing precipitation fouling are to limit the system recovery, Y, by keeping permeate rate below a certain maximum fraction of the feed rate, such that the concentrations of sparingly soluble salts do not greatly exceed saturation in the concentrate end. These saturation limits can be moderately increased by feeding antiscalants to the membrane feed end which increase chemical pretreatment costs. In addition, a requirement imposed by the membrane manufacturers requires that a minimum tangential flow rate exist in each commercial spiral element in order to minimize concentration polarization caused by the buildup of rejected salt convected to the membrane surface by the flux (e.g. for 8 inch diameter spiral NF or RO elements, some manufacturers recommend a minimum flow rate of 45 L/min).

However, in the new low-pressure LPRO (Low-Pressure Reverse Osmosis) and LPNF (Low-Pressure Nanofiltration) membranes, that operate at pressures of 3-10 bar, the axial pressure drops along the feed paths of the membrane elements can significantly reduce the driving force for product water permeation, which requires that flow rates will not be too high through the membrane elements. These conflicting requirements make design of new water treatment plants quite difficult, which resulted in various new strategies that have been proposed (for conventional ways of dealing with this see e.g., "*Innovative System Designs to Optimize Performance of Ultra-low Pressure Reverse Osmosis Membranes*", Nemeth, J., Desalination, 118, 63-71, 1998).

Other ways to control membrane fouling utilizes hydrodynamic and chemical methods, periodic backwashing, chemical cleaning, changing operating conditions, and reducing the operating flux. Another solution for controlling membrane fouling proposes changing the flow direction in order to reduce concentration polarization and fouling in general ("*Ultrafiltration Membranes and Applications*", Breslau, B. R. at al, Polymer Science and Technology, Plenum Press, Vol. 13; "*Flux Enhancement Using Flow Reversal in Ultrafiltration*", Hargrove, S C and Ilias, S., Sep. Sci. Technol., 34 (6&7), 1319). However none of these publications teach or propose a solution for preventing precipitation fouling.

A flow reversal process and device are described in U.S. Pat. No. 5,690,829 (to Lauer), which particularly relates to the cleaning of the membrane from dirt particles. Another possible solution for reducing membrane fouling is described in U.S. Pat. No. 5,888,401 (to Nguyen), which suggests periodically increasing the permeate pressure next to the membrane by partially closing a valve on the permeate side, which results in reductions in the permeate flow rate. This last method reduces the rate of overall permeate recovery which is a disadvantage.

As will be apparent to those skilled in the art, an efficient solution for preventing precipitation fouling has also implications for biofouling since the stagnant layers and surfaces of scale layers can allow biofilms to attach and develop with less shear forces to remove them.

In many processes sparingly soluble salts can limit the recovery of desalination processes as their concentration increases in the brine as more product water is pulled out of the feed flow. Different techniques have been used to cope with this problem (Section 9.4 in Water Treatment Membrane Processes, Mallevialle, J., Odendaal, P., Wiesner, M. eds., McGraw-Hill, 1996). Chemical softening has been proposed to precipitate sparingly soluble salts most of which are salts of alkali earth metals (Ca, Sr, Mg, Ba). The problem with this approach is that it requires stoichiometric amounts of chemicals to precipitate all of the metal ions of sparingly soluble salts, which is often costly. For example, brackish water containing 100 mg/L of calcium, 30 mg/L of magnesium, and 150 mg/L of carbonate alkalinity as bicarbonate will require 91 g/m$^3$ of hydrated lime and 135 g/m$^3$ of soda ash to completely remove the calcium. At 80 $/ton for hydrated lime and 180 $/ton for soda ash this would involve a chemical cost of 1.8 cents/m$^3$. In addition the sludges formed in lime softening are often voluminous and hard to remove. This can be prevented by using advanced precipitation processes that combine precipitation softening with microfiltration, also known as Membrane Assisted Crystallization (MAC) or filtering through a filter cake of calcium carbonate seeds which is also known as Compact Accelerated Precipitation Softening (CAPS).

Alternatively the pH can be reduced by adding acid and removing the carbonic acid formed by air stripping. This type of treatment eliminates the carbonate scales problems but the problems associated with sulfate scales will still remain. In the previously mentioned example of brackish water, it would be necessary to add 120 g of sulfuric acid//m$^3$ of feed water to completely remove carbonate alkalinity. Meanwhile this would raise the risk of exceeding calcium sulfate solubilties.

Consequently, the most common approach today is to use antiscalants which allow operation at various values of super-saturation. However even with the most advance antiscalants used today, there are limits on the super-saturation ratios (for example ~2.60-3.0 for calcium sulfate, a Langlier Saturation Index (LSI—$\log_{10}$ of supersaturation ratio) of 2.8 for calcium carbonate, and supersaturation ratio of 2.0 for silica. This often means that recoveries are often limited to 75-90%.

Alternatively, a NF process may be used to remove the hardness ions, and in this case the permeate from the nanofilter can then be fed to RO or thermal desalination units to recover the desalinated water at fairly high recoveries. However because counterions of the alkali earth metals are also rejected in this process, super-saturation conditions are also reached in the NF process if the recoveries are high enough.

It is important to reach high recoveries in the NF process since the overall recovery in two stages in series will be the product of the two steps. For example, if the recovery of the desalination process is 95% and the recovery of the NF process is 90%, then the overall recovery will be 85.5%. There is no considerable improvement in this result in comparison with the recoveries obtained in standard RO processes. One way of overcoming this problem is to recycle the concentrate of the desalination step to the nanofilter. However, by doing so the average salinity in the desalination process is raised with attendant increase of salinity in the product. A number of researches have proposed using precipitation softening on the concentrate before conducting further desalination on the treated concentrate (Enhanced Water Recovery from Primary Membrane Desalination Concentrate by Precipitative Softening and Secondary Membrane Desalination, Rahardianto, A., Cohen, Y., and Williams, M. D., paper 394e, AIChE Fall meeting, 2004.) in order to increase the recovery. However such a treatment is complicated by the presence of antiscalants in the concentrate.

In view of the aforementioned problems there is a need for filtration processes capable of effectively and efficiently controlling and preventing precipitation fouling in pressure-driven membrane desalination processes, and of improving the recoveries of such processes.

It is an object of the present invention to provide a high-flux filtration process for controlling and preventing precipitation fouling in pressure-driven membrane processes.

It is another object of the present invention to provide a method and system for efficiently controlling flow reversal in a membrane filtration process for preventing precipitation fouling in pressure-driven membrane processes.

It is still another object of the present invention to provide a method and system for preventing precipitation fouling in a membrane filtration process wherein the composition of the solution next to the active membrane surface exceeds the effective saturation limit of sparingly soluble salts.

An additional object of the invention is to provide a method and system for achieving high recoveries in a membrane filtration process operating with high local super-saturations.

Other objects and advantages of the invention will become apparent as the description proceeds.

SUMMARY OF THE INVENTION

In one aspect, the present invention is directed to a process for purifying water containing soluble species capable of forming one or more sparingly soluble salts or minerals, said process comprising feeding a pressurized water stream into a treatment zone having one or more membranes disposed therein, passing said stream along said membrane(s) to recover a permeate and to withdraw a concentrate therefrom while periodically reversing the direction of the flow of said stream in said treatment zone, wherein the periodicity of the flow reversal is such that said one or more membranes are exposed to supersaturation conditions evolving in said water stream for a period of time which is less then the time required for said supersaturated water stream to precipitate one or more of said sparingly soluble salts and/or minerals therefrom.

It may be appreciated that any pressure-driven membrane water purification process running the danger of precipitation of sparingly soluble salts or minerals onto the membrane surface may be practiced according to the present invention. Water purification processes encompassed by the present invention are most preferably selected from the group consisting of desalination, water softening, color removal, disinfection byproducts (DBP) precursors removal, and natural organic matter (NOM) removal, such processes being effected by either reverse osmosis (RO) or nanofiltration (NF).

By the term "sparingly soluble salt or mineral" is generally meant a salt having a solubility product/dissociation constant less than $10^{-2}$ or solubility less than 300 mg/L for non-dissociating minerals. Particularly problematic sparingly soluble salts and/or minerals, the precipitation fouling of which from the treated water stream needs to be substantially prevented according to the present invention, are selected from the group consisting of calcium carbonate, calcium sulfate, silica, calcium phosphate, barium sulfate, strontium sulfate, calcium fluoride.

According to a preferred embodiment, the process according to the present invention utilizes a treatment zone in the form of a pressure vessel comprising at least first, second, and third openings wherein said third opening is used to recover the permeate and is in fluid communication with the interior of said vessel via the membranes, wherein the direction of the flow of the stream via said vessel is periodically reversed between a forward-flow, in which said stream is fed via said first opening and the concentrate is withdrawn via said second opening, and a back-flow, in which said stream is fed via said second opening and said concentrate is withdrawn via said first opening.

The time required for a supersaturated aqueous solution to start precipitating sparingly soluble salts and/or minerals therefrom (in the absence of seed crystals or other appropriate pre-existing crystal growth surface) is known as the "induction time" ($\tau$). Most preferably, the process according to the present invention comprises the estimation of the induction time associated with the composition of the water to be treated and the nature of the membrane surface, to permit the flow reversal to be carried out at the desired periodicity.

According to one preferred embodiment, the induction time is estimated experimentally, for example, by carrying out a preliminary experiment, in which the water stream corresponding to the final concentrate composition is passed along a small membrane unit under flow conditions generating the concentration polarization that would be expected in a full scale unit, without reversing the flow direction. The period of time measured until sparingly soluble salts from said water stream precipitate onto the membrane surface as reflected in a drop in membrane water permeability, or until a drop in the bulk concentration of the sparingly soluble salt is detected, is subsequently used to schedule the flow reversal accordingly. The occurrence of the precipitation of sparingly soluble salts onto the membrane surface may be conveniently tracked by measuring changes to the membrane water permeability, $L_p$, as measured by the flux divided by the net pressure driving force (NDP) as defined by:

$$L_P = \frac{J_V}{NDP} = \frac{J_V}{\Delta P - \Delta \pi} \quad (5)$$

Where $\Delta P$ and $\Delta \pi$ are the transmembrane pressure and the osmotic pressure difference between feed and permeate solutions respectively. Such a preliminary experimental procedure is illustrated in Example 2.

Alternatively, the induction time is estimated using the following equation:

$$\ln(\tau) = \frac{A}{[\ln(S)]^2} + B$$

wherein:

A and B are constants related to the salt, the hydrodynamics and the membrane surface, since the nucleation that must be prevented is the nucleation at the membrane surface. The constant A includes effect of the surface energy at the nucleating surface and molar volume of the salt. B includes the frequency factor for the nucleation rate. Values of A and B have already been determined, for example, for calcium sulfate and polyamide low pressure RO membranes (e.g., D. Hasson at al, "*Induction times induced in an RO system by antiscalants delaying CaSO$_4$ precipitation*", Desalination, v. 157 (2003), p 193; Alimi, F. et al, Desalination V 157, pp 9-16 (2003); He, S. et al, J. Colloid and Interface Science, V 162 pp. 297-303 (1994)). A and B may be also readily obtained experimentally as illustrated in Example 4 herein below.

S is the ratio between the maximum actual activity product of a given sparingly salt in the solution next to the feed side of the membrane and the thermodynamic solubility product, or, for an undissociated mineral (e.g. silica), it is the ratio of the actual maximum mineral concentration to the saturation concentration of that mineral for the given composition. It will increase with product water recovery and concentration polarization. This ratio can be calculated from commercial desalination process simulation programs available in the open market (such as IMS from Hydranautics, Inc or Rosa from Dow-Filmtec, Inc.), or independently as described in D. Hasson at al, "*Inception of CaSO$_4$ scaling on RO membranes at various water recovery levels*", Desalination, 139, 73-81 (2001). S may be also calculated upon measuring data related to the concentration level of salts/mineral in the water stream, and data related to the permeate and concentrate flows. This data can be obtained utilizing appropriately placed flow meters and sensing devices within the system, in order to provide corresponding signals (e.g., conductivity) for calculating S. Typically, induction times are above 10 minutes.

Having obtained and or experimentally determined the values of A, B and S, for the relevant salt and system, one may easily estimate the induction time, τ. The periodic reversal will then be set to take place at some time less than the τ, for example at 0.1 to 0.9 the value of the induction time. In the event that there is more than one sparingly soluble salt, the salt with the shortest induction time will be the one used for determining the period for flow reversal.

Alternatively, the induction time may be determined during system operation via appropriately situated sensors for monitoring permeation rate (flow meter or weigh scale) or scaling ion concentration (e.g. using calcium sensor, or conductivity sensor) as a function of time, to see when these indicators change as a result of precipitation in the system.

According to another preferred embodiment, the process of the present invention further comprises directing the withdrawn concentrate into a crystallizer, precipitating therein one or more sparingly soluble salts and/or minerals, separating the solids from the liquid phase, and returning said liquid to the treatment zone.

In another aspect the present invention is directed to a pressure-driven membrane system for purifying water containing soluble species capable of forming sparingly soluble salts and/or minerals, comprising at least one pressure vessel having one or more membranes disposed therein, a pressure pump for producing a pressurized water stream and a plurality of controllable valves for controlling the direction of a feed flow and concentrate flow therein, wherein said system comprises a control unit linked to said valves, wherein said control unit is adapted to provide said valves with control signals for periodically reversing the direction of said feed and concentrate flow via said pressure vessel within determined time periods corresponding to the induction time related to said salts and/or mineral and said one or more membrane.

Preferably, the control unit estimates the induction time according to the formula $$\tau = e^{\frac{A}{[\ln(S)]^2} + B},$$

wherein A and B are salt/mineral and membrane related constants and S is the ratio between the maximum actual activity product of a given sparingly salt or mineral in the solution next to the feed side of the membrane and the thermodynamic solubility product, said ratio being determined by utilizing sensing means linked to said control unit and adapted to provide it with signals corresponding to said actual activity product.

DETAILED DESCRIPTION OF PREFERRED EMBODIMENTS

Figure 1A:
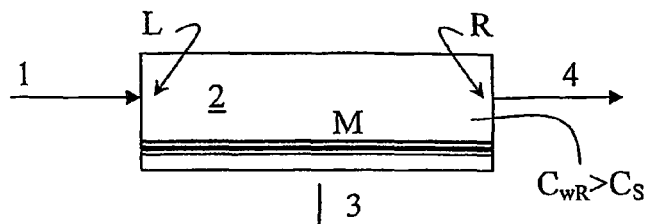
FIGS. 1A and 1B schematically illustrates the flow reversal scheme of the invention.

Throughout the description, the following terms are often used:

Super-saturation conditions, or super-saturation solution: a solution in which the ion activity product exceeds the thermodynamic solubility product for a given salt, or that the dissolved concentration of a given mineral exceeds its equilibrium concentration for the given solution composition.

Under-saturated conditions, or under-saturated solution: a solution in which the ion activity product is less than the thermodynamic solubility product for a given salt, or that the dissolved concentration of a given mineral is less than its equilibrium concentration for the given solution composition.

Water hammer: very rapid pressure wave in a conduit due to a sudden change in flow; the potentially damaging slam, bang, or shudder that occurs in a pipe when a sudden change in water velocity (usually as a result of too-rapidly starting a pump or operating a valve) creates a great change in water pressure.

The present invention provides a pressure-driven membrane water purification (filtration) process wherein precipitation fouling of sparingly soluble salts and/or minerals from the solution to be treated onto the membrane surface is substantially prevented, despite the temporarily evolvement of supersaturation conditions within said solution next to said membrane surface. Hence, the purification process of the invention will permit to relax design constraints related to manufacturers' minimum flow rates and maximum concentration polarization ratios required for membrane elements, allow higher recoveries, and reduce brine volumes. As will be explained herein after, the present invention also provides means of achieving substantially high recoveries even with such temporarily high local super-saturations.

As was discussed hereinabove, the induction time, τ, is related to the super-saturation by the following equation:

$$\ln(\tau) = \frac{A}{[\ln(S)]^2} + B \quad (I)$$

At high recoveries and high concentration polarization, the value of S at the membrane surface increases and consequently the induction time τ is reduced (e.g., D. Hasson at al, Desalination, 139, 73-81, 2001). Accordingly, any increment in the value of the super-saturation S results in a reduction in the value of the induction time τ, namely, the period of time by which precipitation will start to occur is smaller. Moreover, when the value of the super-saturation S approaches unity (S→1), the induction time τ approaches infinity (τ→∞), in other words precipitation will not occur. Without wishing to be bound by theories, it is believed that the brief exposure of a membrane surface, exposed to a super-saturated solution, to an under-saturated solution resets the "clock of precipitation time" (i.e., the accumulated time before commencement of precipitation is zeroed). This means that when the membrane is again exposed to the super-saturated solution the accumulating time by which precipitation supposes to start is restarted from zero. Therefore, if arrangements are made to change the solution next to the membrane to one whose composition is at, or near, saturation, within time intervals smaller than the induction time τ corresponding to the super-saturated solution, precipitation will not occur on the membrane because the induction time will never be reached.

The substantial prevention of precipitation fouling of one or more sparingly soluble salts and/or minerals, as provided by the present invention, may be ascertained using one or more of the following three tests.

First, the effective permeability of the membrane, Lp, as defined in equation (5) hereinbelow, does not drop below a value indicated in the manufacturer's design guidelines in respect thereto. For example, Lp is reduced by no more than 0.1 to 5% during one month of operation. If the reduction of the value of Lp exceeds the aforementioned percentage, then it is necessary to check the formation of mineral scales on the membrane surface (as determined by membrane autopsy)

Second, the following mass balance equation $Q_f \times C_f - (Q_r \times C_r + Q_p \times C_p)$, wherein $Q_f$, $Q_r$, $Q_p$, $C_f$, $C_r$ and $C_p$ are as defined hereinabove, may be periodically calculated for each salt/mineral present in the water treated. It may be appreciated that in the event that precipitation fouling has been substantially prevented, then the deficiency from mass balance should not to exceed the experimental deviation of the measurement, or should not increase in time.

Third, the concentrate stream may be suitably sampled in order to visually observe turbidity therein.

It has been found that the present invention permits conducting pressure-driven membrane water purification processes under improved conditions comparative to those recommended in the manufacturer's specification for the relevant membrane.

For example, the membranes can be operated at a lower pressurized feed and/or concentrate flow rates than the lowest value recommended in the manufacturer's specification. Preferably, the present invention allows a reduction of 10% or more at said flow rates for a given membrane element size (e.g. 45 L/min for 8 inch diameter spiral element), and recovery that is 10% or more higher than the maximum recommended recovery per element defined as $Q_{p,ele}/Q_{f,ele}$ where Q is a flow rate and element refers to the individual element and subscripts "p" and "f" refer to permeate and feed respectively.

Another improved aspect afforded by the invention relates to the concentration polarization ratio. The process according to the present invention may be effectively carried out under concentration polarization ratios (often denoted as β) above 1.2.

It has also been found that the present invention allows a reduction of more than 15%, and more preferably, more than 25%, in the concentration of antiscalants that may be applied, if desired, in pressure-driven membrane purification processes, as recommended by manufacturers' programs (e.g. Genesys Ltd.).

Figure 1B:
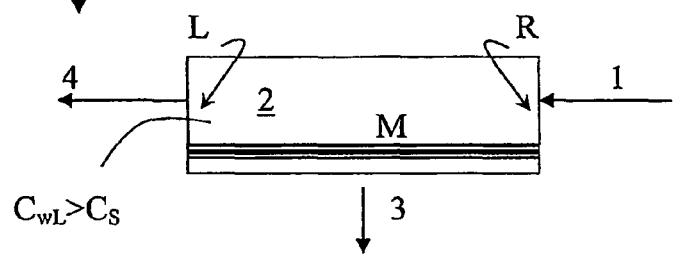

Referring now to the figures, the flow reversal scheme of the invention is illustrated in FIGS. 1A and 1B. In FIG. 1A, a feed flow 1, for which the concentration of sparingly soluble salt $C_1$ is less than that of the saturation concentration $C_s$ ($C_1 < C_s$) is pressurized with a high pressure pump (not shown). The high pressure feed flow 1 is fed to the pressure vessel (PV) 2 via its first opening (L). PV 2 comprise a series of membrane elements M separating between a third opening (permeate exit $Q_3$) and the bulk of PV 2, such that permeate flow 3 leaving the PV 2 via said third opening is entirely provided via membrane elements M. The membrane elements M removes a considerable amount of filtration into the permeate flow 3 which results with a concentrate flow 4 that is concentrated with the retained sparingly soluble salts. The concentration $C_4$ of the sparingly soluble salts in the concentrate flow 4 can be formulated as follows:

$$C_4 = \frac{Q_1 \cdot C_1 - Q_3 \cdot C_3}{Q_4} \quad (II)$$

where $C_i$ (i=1, 3 or 4) designates the concentration (e.g., in g/L), $Q_i$ (i=1, 3 or 4) designates the volumetric flow rate (e.g., in L/hr), and the index i designates the process flow to which the concentration and flow rate refers. The recovery Y is typically defined as follows: $Y = Q_3/Q_1$, namely, the portion of the feed flow 1 removed as permeate flow 3. Accordingly, since $Q_4 = Q_1 - Q_3$, equation (II) can be rewritten as follows:

$$C_4 = \frac{C_1 - Y \cdot C_3}{(1 - Y)} \approx \frac{C_1}{(1 - Y)} \text{ when } C_3 \ll C_1 \quad (III)$$

If the recovery Y is high enough, then the sparingly soluble salt concentration $C_4$ of concentrate flow 4 can be greater than the saturation concentration ($C_s$), such that the second opening (R) of PV 2 is actually provided with a super-saturated concentrate solution. Due to concentration polarization, the concentration of sparingly soluble salt ($C_w$) at the wall of membrane M is always greater than the concentration (C) of the solution in the bulk of PV 2. Therefore, if the concentrate flow 4 via the second opening (R) of PV 2 is slow enough, then the concentration polarization at the membrane wall $C_w$ can be significantly large such that the concentration $C_{wR}$ via the second opening of PV 2 exceeds the saturation concentration $C_s$ ($C_{wR} > C_s$), even if the concentration C of the solution in the bulk of PV 2 is less than the saturation concentration (i.e., $C_{wR} > C_S > C_4$). Under conditions of super-saturation at the surface of membrane M, there will be a corresponding induction time $\tau_{wR}$ associated with the concentration $C_{wR}$ of concentrate flow 4.

If the flow direction is reversed, within a period of time smaller than $\tau_{wR}$, as shown in FIG. 1B, then the second opening (R) of PV 2 is exposed to the high pressure feed flow 1, which its concentration is $C_1 < C_S$. Consequently, the accumulated precipitation time for commencement of precipitation at the right side R of pressure vessel 2 (R Clock in FIG. 2D) is reset, and it is restarted again only when the flow direction is restored to that shown in FIG. 1A. Similarly, under the conditions described in FIG. 1B, if the recovery is high enough and the flow rate of concentrate flow 4 is low enough, then the concentration $C_{wL}$ at the left side L of PV 2, will exceed the saturation concentration $C_S$ ($C_{wL} > C_S$). Correspondingly, the induction time associated with the concentration $C_{wL}$ at the left side of PV 2 in such conditions is $\tau_{wL}$. If the flow is reversed within a period of time smaller than $\tau_{wL}$, and the situation reverts to that illustrated in FIG. 1A, the accumulated time for the commencement of precipitation at the left side (L) of PV 2 (L Clock in FIG. 2D) is reset, and accordingly the accumulating precipitation time at the right end (R) of PV 2 is restarted from zero.

In general, super-saturation conditions can still be reached not only at the first and second opening of PV 2 but also further in its bulk. However, in the most extreme situations the highest super-saturations are usually obtained at said opening of PV 2. In any event the process of the present invention can be effectively carried out as long as every part of the membrane elements M is periodically exposed to a solution undersaturated with respect to sparingly soluble salts.

Figure 2A:
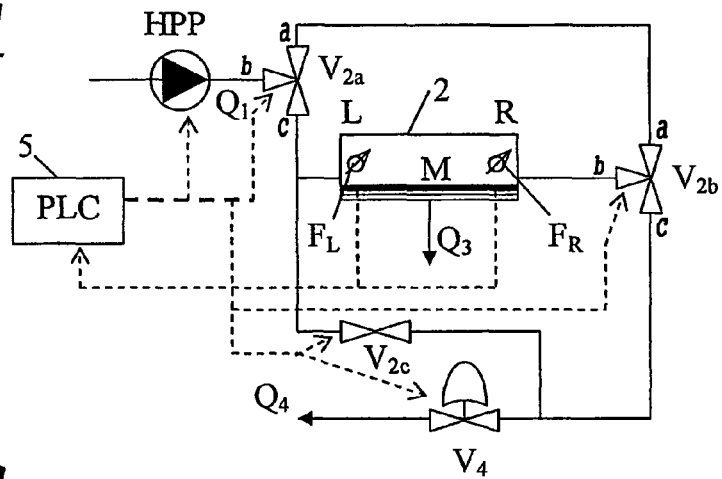
FIGS. 2A-2C demonstrates a particular embodiment of a system for periodically reversing the flow direction through a pressure vessel.
Figure 2B:
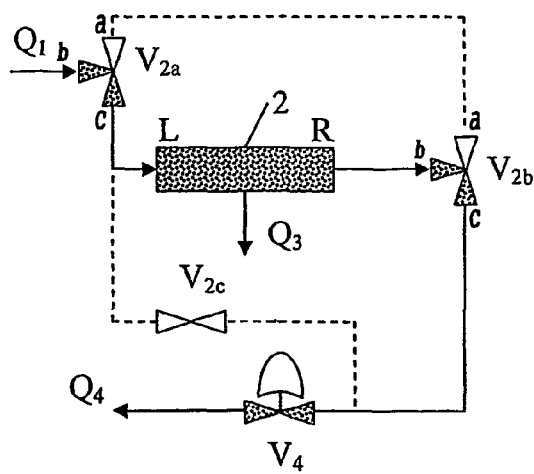
Figure 2C:
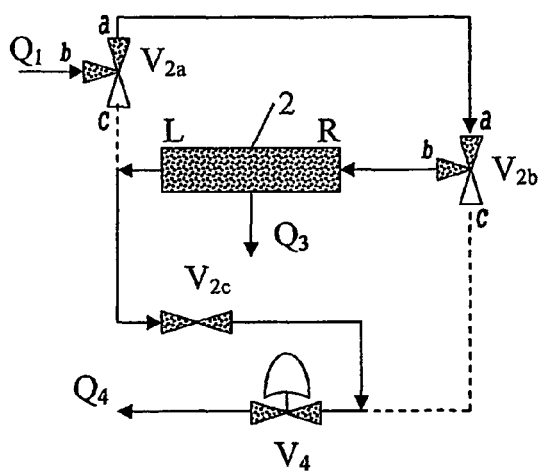
Figure 2D:
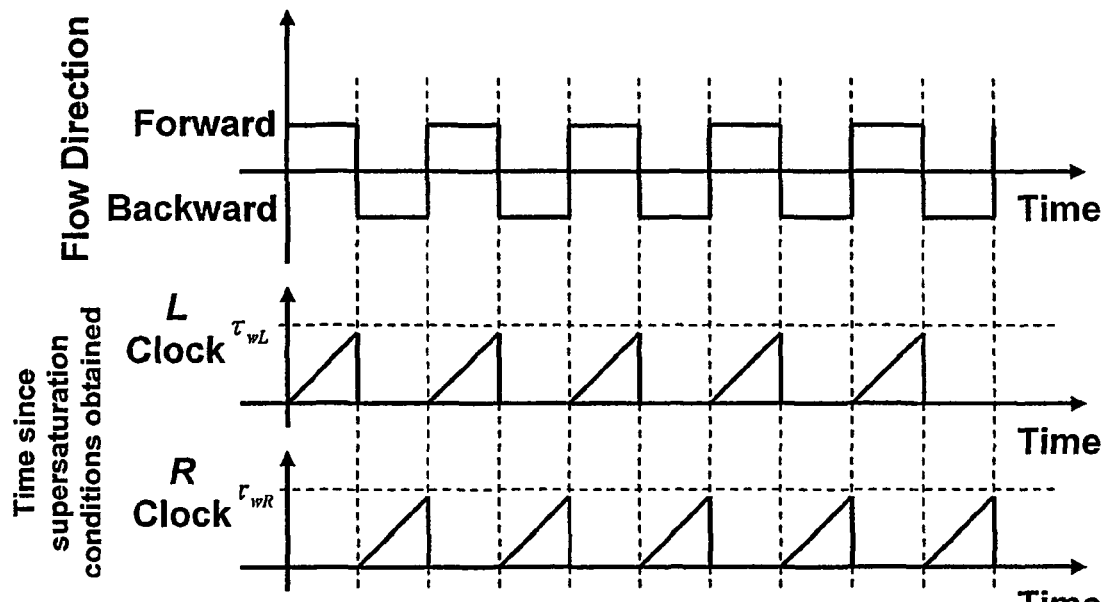
FIG. 2D is a time diagram demonstrating the precipitation clocks next to the membranes.

FIGS. 2A-2C demonstrates a preferred embodiment of a filtration system for periodically reversing the flow direction through a pressure vessel. The system shown in FIGS. 2A-2C is provided herein for the purpose of demonstration and it should not be construed as limiting the scope of the present invention in any way. Of course, the flow reversal scheme of the present invention, or the general approach of periodically reducing the concentration of sparingly soluble salts below their saturation limit, is not limited to this particular embodiment.

The flow reversal system shown in FIGS. 2A-2C consists of a High Pressure Pump (HPP, FIG. 2A), a flow manifold consisting of two 3-way valves (feed-valve) $V_{2a}$ and (transfer-valve) $V_{2b}$, one 2-way valve (bypass-valve) $V_{2c}$, and a back-pressure-valve $V_4$ for developing/maintaining pressure in the flow loop, a set of RO and/or NF membrane elements M in series loaded in PV 2, and the appropriate ductwork and piping for connecting between a first port (a) of said 3-way valves, connecting a second port (b) of valve $V_{2a}$ to said pump, connecting a second port (b) of valve $V_{2b}$ to a second opening (R) of PV 2, connecting a third port (c) of valve $V_{2a}$ to a first opening (L) of PV 2, connecting a third port (c) of valve $V_{2b}$ to an inlet of said back-pressure-valve $V_4$, and for connecting the ports of said bypass-valve $V_{2c}$ to the first opening (L) of PV 2 and to said inlet of back-pressure-valve $V_4$.

In general, the PV 2 can represent one or more actual pressure vessels connected in parallel, which are preferably having the same number of membrane elements. Similarly, PV 2 can represent more than one pressure vessels in series. The valves and pump are preferably controllable and their operation is preferably controlled by control signal provided by controller 5 (e.g., PLC—Programmable Logic Controller, a computer or timer control—e.g. Siemens Logo 12/24 RC controller). The controller 5 estimates the induction time using the following equation:

$$\ln(\tau) = \frac{A}{[\ln(S)]^2} + B$$

upon receipt of the values of the constants A and B, and upon receiving data related to the concentration level of salts/mineral in the water stream at the vicinity of the first and second opening of the pressure vessel, and data related to the permeate and concentrate flows. This data can be obtained utilizing flow meters (not shown) and at least two sensing devices linked to controller 5, wherein said sensing devices and flow meters provide said controller 5 with corresponding signals for calculating S, and thereby estimating said induction time.

The operation of controller 5 is preferably as follows. At the first and second opening of the pressure vessel 2 sensors $F_L$ and $F_R$ may be placed, that are linked to controller 5, for sensing the concentrations at the left and right ends of pressure vessel 2, respectively. The valves and pump are preferably linked to controller 5, which is programmed to operate said valves and pump by providing them with control signals. In one embodiment controller 5 switch valve states for effectuating flow reversal at set times previously programmed into it based on preliminary experiments or calculations made to estimate the induction time. In another embodiment the controller 5 may be adapted to calculate the induction times, $\tau_{wL}$ and $\tau_{wR}$, according to the concentrations sensed by the sensors, $F_L$ and $F_R$, and according to the concentrate and permeate flows obtained via flow meters or weigh scale (not shown), and accordingly control the operation of the system according to the flow reversal scheme of the invention based on some fraction of the induction times $\tau_{wL}$ and $\tau_{wR}$. In this case controller 5 should have processing capabilities and it may be embodied utilizing a CPU for processing the sensed data and computing the inductions times, and may also require analog-to-digital converter(s) for converting the sensors signals if they are not provided in a digital form.

In the standard forward (forward-flow) direction shown in FIG. 2B, the feed flow $Q_1$ is delivered via the first opening (L) of PV 2 via valve $V_{2a}$, and concentrate flow $Q_4$ exits via the second opening (R) of PV 2 via valve $V_{2b}$. Under these conditions bypass-valve $V_{2c}$ is closed and the valve $V_{2a}$ and the valve $V_{2b}$ are in a state in which flow can pass between their b and c ports.

Figure 4:
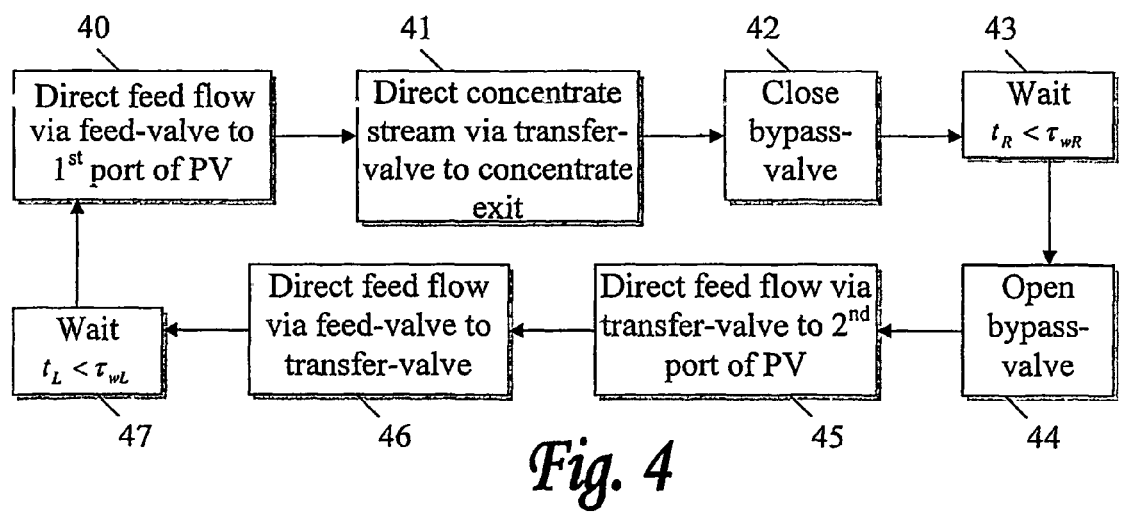
FIG. 4 is a flowchart of a preferred control sequence for flow reversal according to the invention.

When transiting into the reverse flow shown in FIG. 2C (i.e., feed flow $Q_1$ enters PV 2 via its second opening (R) and concentrate flow $Q_4$ exits PV 2 via its first opening (L)), the following steps (shown in FIG. 4) are performed after waiting a time period $t_R$ as shown in step 43 of FIG. 4. In step 44, bypass-valve $V_{2c}$ is opened in order to allow the concentrate flow $Q_4$ to flow via the first opening (L) of PV 2 towards the concentrate exit via back-pressure-valve $V_4$. In step 45, the state of valve $V_{2b}$ is changed into a state in which the flow pass between it's a and b ports, thereby directing the feed flow that will arrive from the valve $V_{2a}$, via the valve $V_{2b}$ to the second opening of PV 2. Step 45 is followed by step 46, in which the state of valve $V_{2a}$ is changed into a state in which the feed flow pass between it's a and b ports, thereby directing the feed flow via valve $V_{2a}$ to valve $V_{2b}$. This sequence of operations is required in order to prevent a "water hammer", an effect which can damage the membrane element M.

As shown in FIG. 4, after waiting a time period $t_L$ (step 47) the system is returned to the standard forward flow direction by conducting this sequence of operations in the reverse order (steps 40-42 in FIG. 4). The transit from the reverse flow to the forward flow is determined in step 47, wherein the state of the valves of the system remains unchanged for a period of time $t_L$ that is less than the induction time $\tau_{wL}$ associated with the concentration at the left side (L) of PV 2.

The transit of the system from the reverse flow state into the forward flow state is started in step 40 wherein the state of the valve $V_{2a}$ is changed into a state in which the feed flow pass between its b and c ports, in order to divert the feed flow towards the first opening (L) of PV 2. Next, in step 41, the state of the valve $V_{2b}$ is also changed into a state in which the flow pass between its b and c ports, in order to divert the concentrate flow $Q_4$ from the second opening (R) of PV 2 towards the concentrate exit via back-pressure-valve $V_4$. After changing the state of valves $V_{2a}$ and $V_{2b}$, in step 42 the bypass-valve $V_{2c}$ is closed. In step 43 the system state remains unchanged for a period of time $t_R$ that is less than the induction time $\tau_{wR}$ associated with the concentration at the right side (R) of PV 2. After expiration of said period of time $t_R$, a transit into the reverse flow state is carried out in steps 44-46.

The time period t is preferably chosen within the time range $0.1\tau \leftrightarrow \tau$ of the respective induction time. While time periods t longer than the induction time $\tau$ could be chosen, this would then make the system dependent on dissolving already precipitated solids rather than on zeroing the induction clock. This would be a much riskier procedure. The choice of a minimal time period t between flow reversals should be guided by the time of reaction required of the system (pumps and valves) and would be known to those versed in the art of constructing desalination plants.

Figure 3:
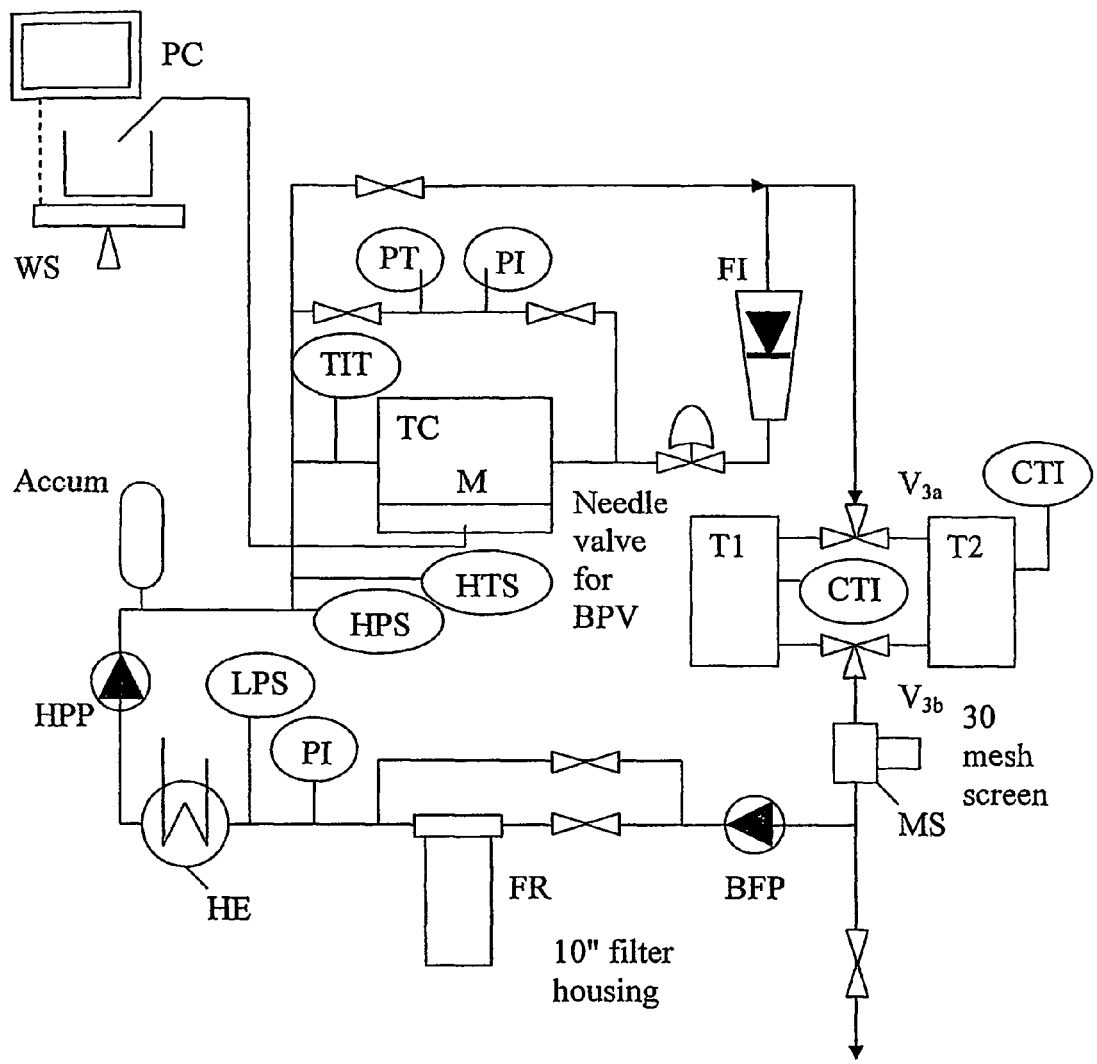
FIG. 3 demonstrates a laboratory setup for simulating the effect of flow reversal.

FIG. 3 demonstrates a laboratory setup for simulating the effect of flow reversal in a membrane element first provided with a feed solution and then with the concentrate solution. This setup consists of a flat sheet membrane Test Cell (TC) containing a flat sheet membrane sample (M), a High Pressure Pump (HPP) to pressurize the test fluid, Flow Meter (FI) to measure tangential flow rate in the test cell via valve (BPV), Pressure Indicator (PI) and Pressure Transmitter (PT), a Weigh Scale (WS) connected to a computer (PC) for measuring the rate of permeation, and two feed tanks (T1 and T2). Tanks T1 and T2 contain solutions that are under-saturated and super-saturated with calcium sulfate respectively. Two three way valves ($V_{3a}$ and $V_{3b}$ on the feed and return lines respectively) are used to switch operation between tanks T1 and T2. A fresh 5 micron filter (FR) was placed in line in each experiment in order to remove suspended particulate so only calcium sulfate nuclei formed on the membrane could cause precipitation fouling and flux decline. This setup further comprise time controllers (CTI) for operating valves $V_{3a}$ and $V_{3b}$, a mesh screen (MS) for filtering the solutions obtained from the tanks, a low pressure pump (BFP) connected to the inlet of filter FR. At the outlet of filter FR an additional PI, heat exchange (HE), and low-pressure-sensor (LPS) are connected. The stream provided by the HPP is connected to a shock absorbing vessel (Accum) and to a high pressure sensor (HPS) and high temperature sensor (HTS). Turbidity sensor (TIT) can also be used, as well as conductivity and pH sensors (not shown).

The effect of switching flow direction to prevent precipitation fouling is simulated by switching from tank T2 to tank T1 at time intervals that are less than the induction time for the super-saturated solution in tank T2. The experiments described below were conducted with a solution of 0.03 M $CaSO_4$ which gives a supersaturation ratio of ~2.0 for pure calcium sulfate dehydrate (gypsum) solutions in tank T2. This was formed by mixing equal volumes of 0.06 M $H_2SO_4$ and 0.06 M $Ca(OH)_2$. The tank T1 contained a solution of 0.01 M $CaSO_4$ which is under-saturated with respect to calcium sulfate dehydrate. In the blank experiment the solution was fed from tank T2 and the accumulated permeate was measured on the weigh scale (WS) and recorded on the computer (PC). From the weight change $\Delta W$ with time $\Delta t$ the flux $J_v$ was calculated according to the following formula:

$$J_V = \frac{\Delta W}{\Delta t} \cdot \frac{1}{\rho A} \quad (IV)$$

where A is the membrane area (34.2 $cm^2$ and $\rho$ is the density of the permeate stream). In this way the specific flux was calculated as follows:

$$L_P = Sp.Flux(L/m^2 \times h \times bar) = \frac{J}{\Delta P - \Delta \pi} \quad (V)$$

where $\Delta P$ is the applied pressure, $\Delta \pi$ is the difference between the osmotic pressure of the feed flow and the permeate flow. In this case the osmotic pressure of the permeate flow is negligible compared to the feed flow and $\Delta P$ was essentially equal to the applied pressure of the feed flow. In each experiment the specific flux was plotted as a function of time. If the specific flux began to drop this would be a sign that precipitation fouling had begun.

Figure 5:
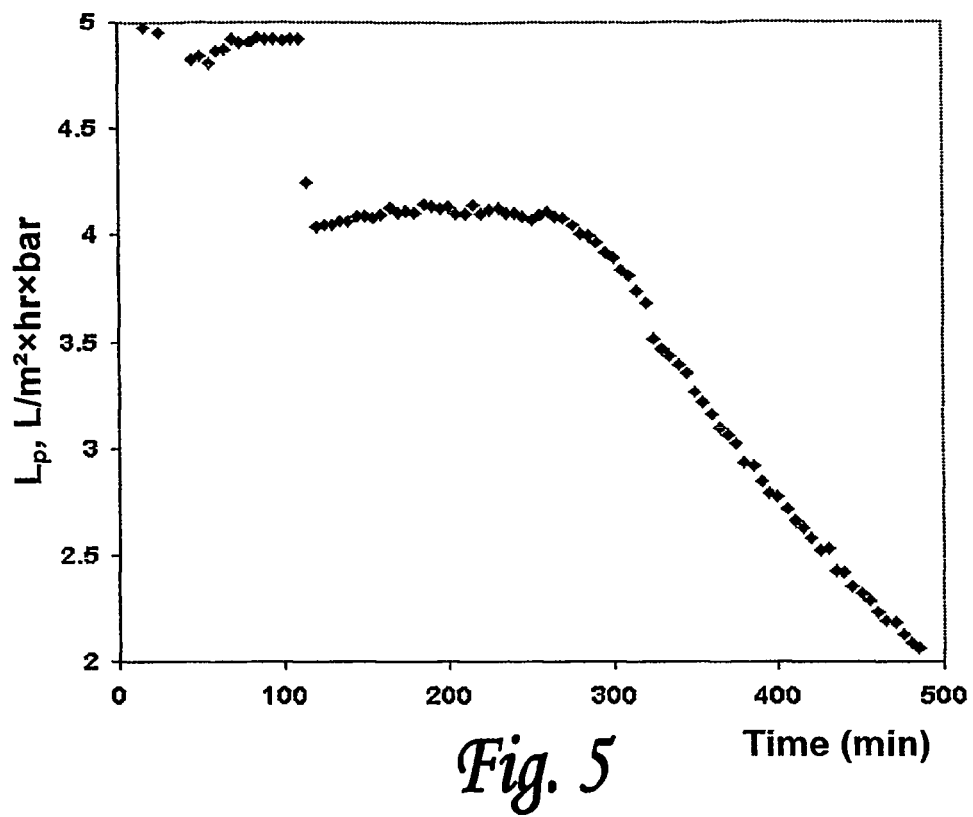
FIG. 5 shows a trace of flux against time showing the fouling induction time for calcium sulfate without flow reversal.

FIG. 5 shows a trace of flux against time of the results of an experiment carried out using RO membrane BW3O running at a flux of 35 $L/m^2 \times h$ on a calcium sulfate solution at super-saturation ratio of 2.0, without switching the tanks with and a feed flow rate of 100 L/hour (linear velocity of 0.73 M/s). As seen, after ~100 minutes, there is an initial dropoff in specific flux due to sealing the dead areas in the margins of the flow cell. After an additional plateau of ~170 minutes, a steady decline in the specific flux of the membrane commences. In this experiment, a mixer was used to keep the solution mixed in tank T2. In two more experiments, the same experiment was conducted without mixing the contents in tank T2, and in both experiments the induction time was found to be 60-65 minutes, i.e., steady decline in specific flux commenced after 60-65 minutes.

Figure 6:
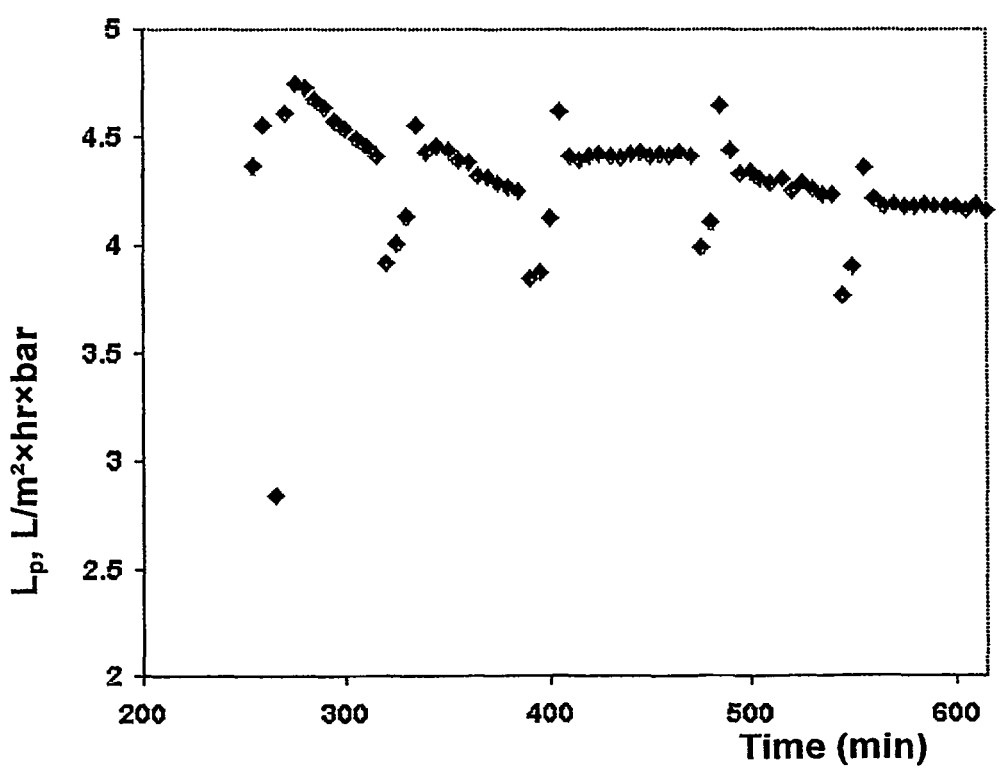
FIG. 6 shows a trace of flux against time showing the prevention of fouling when simulating flow reversal.

In a follow up experiment with the same pressure and linear flow rate, with the same solution and the same membrane, the test feed solution was switched after 60 minutes from tank T2 to tank T1 containing 0.01 M calcium sulfate solution (~67% of saturation concentration) for ten minutes. Then the feed tank was again switched back to tank T2 with the super-saturated calcium sulfate solution for another hour. Conductivity results showed that the concentration in tank T2 did not change substantially during the experiment. This process was repeated over an extended period of time. The results are shown in the trace of FIG. 6. The periodic disturbances in the calculated specific flux represent the points at which the super-saturated solution was switched out for 10 minutes and replaced with under-saturated solution. As can be seen the flux is fairly stable for 360 minutes (6 hours). This shows the efficacy of the reverse flow method in preventing precipitation fouling when the time between flow transitions is kept lower than the induction time. This also provides evidence for the hypothesis that the accumulating time for commencement of precipitation is reset in a system where the super-saturation condition is temporarily relieved.

EXAMPLE 1

This is a calculation example comparing performance of an RO unit desalting brackish water with calcium sulfate fouling potential using a standard tapered flow design and the example using reverse flow to reduce energy and chemical costs. This example uses the commercial membrane design software, Integrated Membrane Systems, of Hydranautics, Inc, but any standard commercial software could be used to generate the same results. Column 2 of table 2 represents the composition of the brackish water to be treated and is similar in its major ion composition to the water of wells sampled at Mashabe Sadeh in the Israel Negev region. The water composition is detailed in Table 2 here below.

TABLE 2

Compositions in RO of Negev region brackish water

|  | Raw | Feed | Concentrate (80% recovery) |
|---|---|---|---|
| Species |  |  |  |
| $Ca^{+2}$ | 206 | 206 | 973 |
| $Mg^{+2}$ | 72 | 72 | 402 |
| $Na^+$ | 624 | 624 | 2632 |
| $K^+$ | 17.5 | 17.5 | 78 |
| $NH_4^+$ | 0.3 | 0.3 | 1.3 |
| $CO_3^{-2}$ | 0.3 | 0 | 0 |
| $HCO_3^-$ | 324 | 115.3 | 353 |
| $SO_4^{-2}$ | 420 | 586.5 | 2714 |
| $Cl^-$ | 1030 | 1030 | 4802 |
| $SiO_2$ | 17.5 | 17.5 | 74 |
| General Properties |  |  |  |
| pH | 7.4 | 6 | 6.7 |
| Temp. °C. | 25 | 25 | 25 |
| TDS | 2711.6 | 2672 | 12042 |
| Conductivity | 4713 |  |  |
| LSI | 0.49 | −1.36 | 0.51 |
| % saturation ($CaSO_4$) | 11% | 15% | 102 |

Since the LSI (gap between actual pH and the pH at which the given water would be at saturation with respect to calcium carbonate—this is also equal to the $\log_{10}$ of supersaturation ratio S as described above) is greater than 0, the water must be acidified in order to prevent calcium carbonate deposits. To affect this, acid must be added so that the feed pH is 6. As a result of adding 140 mg/L of sulfuric acid the treated feed water composition becomes as shown in column 3 of Table 2. A standard design generating 20 m³/h of product at 80% recovery with 21 elements using low pressure brackish water RO membranes of type ESPA 1 (average flux of 26 L/m²h) requires two stages in a 2-1 array with three pressure vessels with 7 elements in each. In order to keep the permeate flows balanced, a 4 bar booster pump is inserted between the first and the second stage. After 80% recovery, the composition of the concentrate is given by column 4 in Table 2. As shown, the LSI is still slightly positive (0.51) and the calcium sulfate concentration is slightly above saturation (supersaturation ratio 1.02). Since the concentration polarization is 1.07, the actual wall super-saturation (Cw/Csat) is 109%. As a result, some antiscalant such as polyacrylates, polyphosphates or organophosphonates would be required to prevent scaling. The results of the conventional design are given in column 2 of Table 3 here below.

TABLE 3

Results of different designs for producing 20 m³/h at 80% recovery using ESPA1 8040 elements.

| Design | Conventional with booster | Reverse flow |
|---|---|---|
| Stage 1 |  |  |
| No. Pressure vessels | 2 | 3 |
| No. of elements/PV | 7 | 7 |
| Inlet P, bar | 8.6 | 9 |
| Outlet P, bar | 6.5 | 8.2 |
| Permeate, m³/hr | 14.5 | 20 |
| Conc flow per PV, m³/h | 5.25 | 1.7 |
| Stage 2 |  |  |
| No. Pressure vessels | 1 |  |
| No. of elements/PV |  |  |
| Inlet P, bar | 10.5 |  |
| Outlet P, bar | 8.7 |  |
| Permeate, m³/hr | 5.5 |  |
| Conc flow per PV, m³/h | 5 |  |
| Average perm TDS (overall) | 215 | 236 |
| LSI (exit) | 0.51 | 0.48 |
| $CaSO_4$ (Saturation Ratio) exit | 1.02 | 1.02 |
| $CaSO_4$ (Saturation ratio) exit wall | 1.09 | 1.16 |
| Energy consumption, kWh/m³ | 0.46 | 0.405 |
| Chemical consumption |  |  |
| $H_2SO_4$ (100%), g/m³ | 140 | 140 |
| Antiscalant, g/m³ | 1 | 0 |

An alternative design would be to place all three pressure vessels in parallel without a booster pump. This design would give a lower pressure drop resulting in less energy but the last element would be operated at less than the manufacturer's minimum limit (1.7 m³/h instead of 2.7 m³/h). By reversing the flow in a single stage, precipitation fouling would be prevented. The results for this experimental design are given in column 3 of Table 3. It can be seen that the reverse flow design has the following savings: no antiscalant other than acid required, over 10% energy reduction, elimination of a booster pump of 1.5 kW (83% pump efficiency, 93% motor efficiency).

EXAMPLE 2

Measuring Calcium Sulfate Induction Times on Pilot RO Unit

Figure 8:
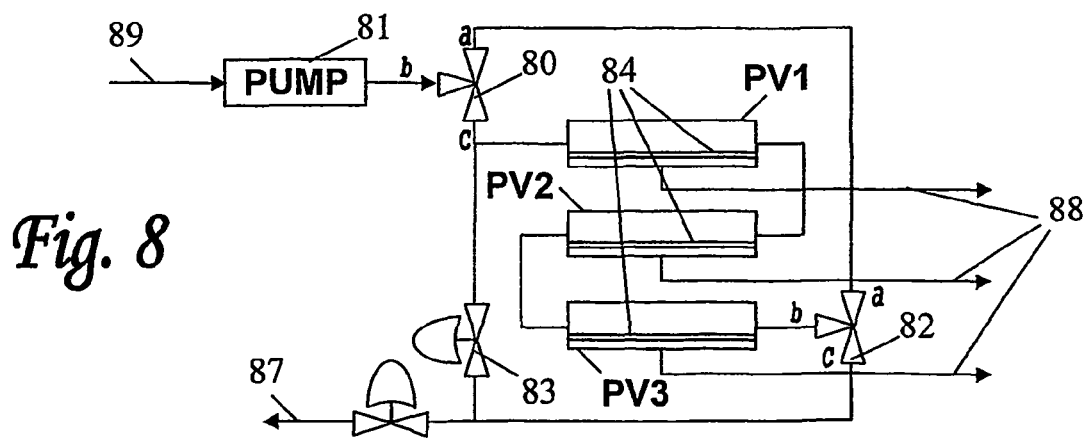
FIG. 8 is a block diagram demonstrating a test unit for running solution with super-saturation.

A block diagram of the test unit that was used in this example is shown in FIG. 8. As shown in FIG. 8, three PVs, PV1, PV2 and PV3, were connected in series each containing 2 spiral wound elements 84 of ESPA1 low pressure membrane from Hydranautics Inc. with 2.5 inch diameter and 40 inch length for a total of 6 elements in series (6×2.6 15.6 m² total membrane area). The feed tank (not shown) was filled with 100 L of a solution of sodium sulfate to which an equimolar solution of calcium chloride was added. Two levels of feed solutions (89) were used: (i) 7.5 mM calcium sulfate (with 15 mM NaCl); and (ii) 10 mM calcium sulfate (with 20 mM NaCl). These feed solutions (89) were under-saturated with respect to calcium sulfate dihydrate. The saturation index for 7.5 mM solution was 0.32 and that for 10 mM calcium sulfate was 0.46. In order to generate super-saturation, the pressures were adjusted so that 65-82% of the feed flow 89 was recovered as permeate 88. The rate of the feed flow 89 was maintained at 1000-1100 L/h. As a result the required fluxes ranged from 35-45 L/m²h in the last PV, PV3, and were an average ~50 L/m²h for the entire membrane element train. This lead to supersaturation ratios reaching as high as 2.07 in the bulk concentrate at the exit of the PV and as high as 5.4 at the membrane wall.

It should be noted that the feed solution in the feed tank is always less than the saturation concentration since the permeate flow 88 and concentrate flow 87 are returned to the tank and mixed there (total recycle of streams). In addition, a special weir was placed in the feed tank to prevent the concentrate "short circuiting" (i.e., the situation where concentrate from the return line flows directly to the feed outlet of the feed tank which connects to the feed pump without mixing with the rest of the feed tank solution volume). In this way the membranes 84 are exposed to super-saturation conditions without the feed flow 89 being supersaturated. This design prevents bulk super-saturation in the feed tank that could introduce errors in the results of the experiment. Thus the composition of the feed tank stays constant throughout the experiment unless there is precipitation on the membranes 84 or on other parts of the concentrate line.

The flow reversal in this experiment is affected in a similar manner to that described with reference to FIGS. 2A-2C. Namely, by switching the flow direction via valves 80 (feed-valve) and 82 (transfer-valve) from passing through ports "b"-"c" to passing through ports "a"-"b" PV1 is switched from being the first PV in the PV series to become the last PV in the PV series. Accordingly, in this way PV3 is switched from being the last PV in the PV series and becoming the first PV in the PV series. The flow direction was switched every 0.5 hours and the conductivity of permeate flow 88 and concentrate flow 84 and the flow rate of the permeate from PV3 were monitored on a data logger, whether PV3 was first or last in the PV series. In addition, manual samples were taken of concentrate flow 87, permeate flow 88, and feed flow 89, during the course of the experiment. These samples were then analyzed for conductivity and soluble calcium. Similarly the applied transmembrane pressure was monitored and recorded on the data logger.

Figure 9:
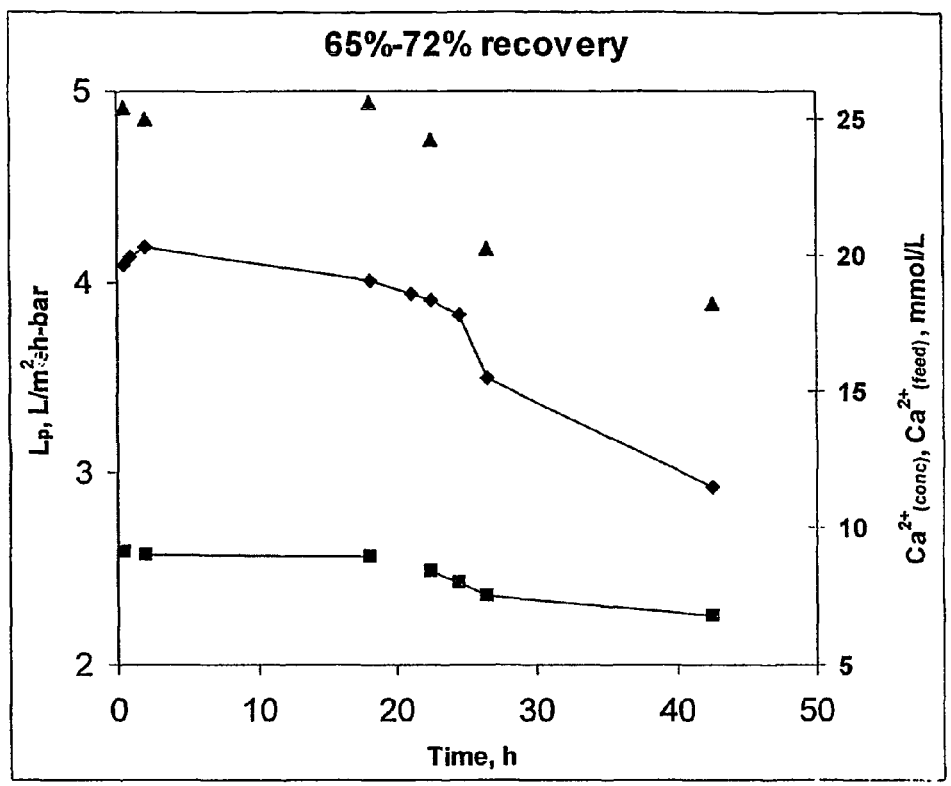
FIG. 9 is a trace showing the results obtained when operating with calcium sulfate (9 mmol/L in the feed tank) in the unit shown in FIG. 8.

The results of the induction time experiments, which were performed with the pilot unit shown in FIG. 8, are shown in the traces of FIGS. 9-12. FIG. 9 is a trace showing the results obtained when operating with calcium sulfate (9 mmol/L in the feed tank) in the unit shown in FIG. 8. Overall recovery was kept at 0.65-0.72. The squares and triangles in FIG. 9 designate calcium ion concentration in feed and concentrate streams respectively, and the diamonds designates water permeability or specific flux (Lp) at 25° C.

Figure 10:
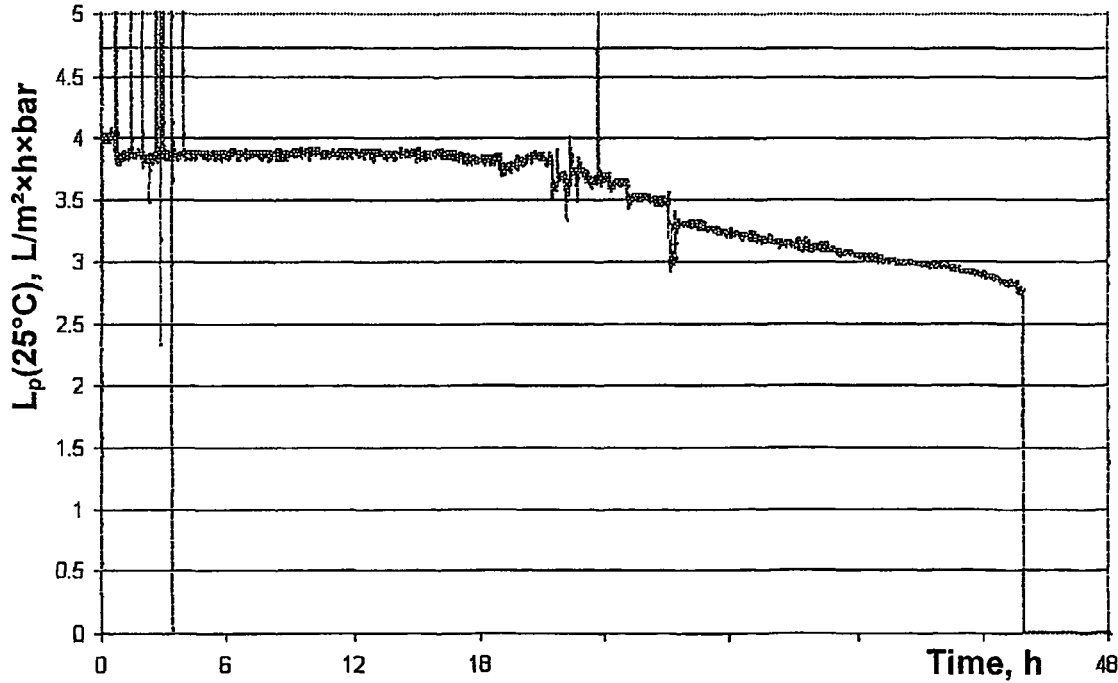
FIG. 10 is a trace showing the permeate flow rate from the last pressure vessel as a function of time in the same experiment as illustrated in FIG. 9.
Figure 11:
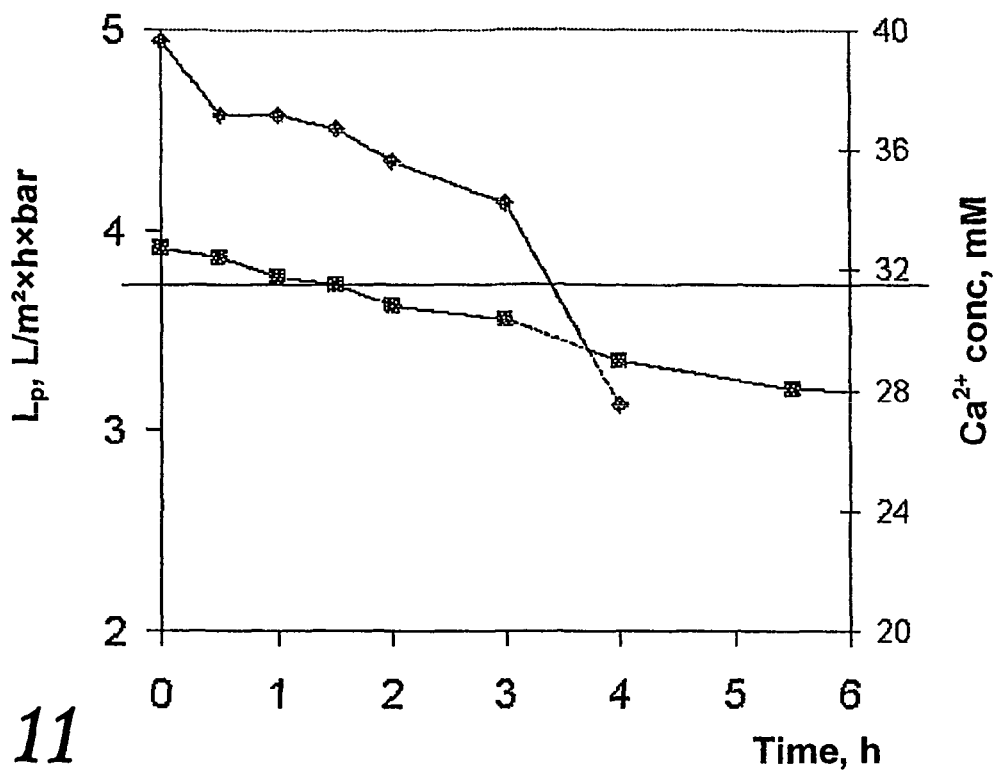
FIG. 11 is a trace showing the results obtained when operating with calcium sulfate (~8.5 mmol/L in the feed tank) in the unit shown in FIG. 8.
Figure 12:
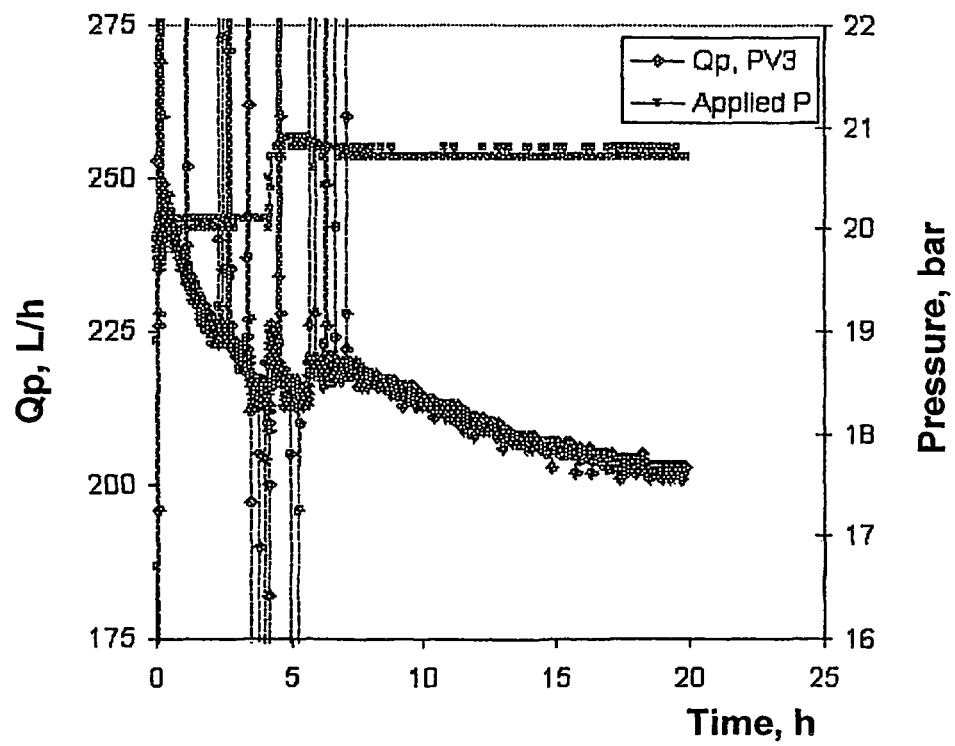
FIG. 12 is a trace showing the permeate flow rate from the last pressure vessel as a function of time in the same experiment as illustrated in FIG. 11 and the applied pressure as a function of time in that same experiment.

The trace of FIG. 10 depicts the permeate flow rate from the last pressure vessel as a function of time in the same experiment as illustrated in FIG. 9, and the trace shown in FIG. 11 depicts the results obtained when operating the unit shown in FIG. 8 with calcium sulfate (~8.5 mmol/L in the feed tank). In this run the overall recovery was kept at 0.82. The triangles in this trace designate calcium ion concentration in concentrate streams, and the squares designate water permeability at 25° C. As can be seen in FIGS. 9-10 for 65-72% recovery, the onset of precipitation can be distinguished by the drop in all three parameters: effective membrane permeability (Lp) of the membrane elements in PV3, calcium content, in the concentrate and calcium content in the feed tank, (The slight discrepancy in Lp values between FIGS. 9 and 10 arises from the method of calculation of the osmotic pressure). In FIG. 9, the calculation is more exact as it is based on chemical analysis whereas in FIG. 10 osmotic pressures were calculated based on conductivity).

According to FIG. 9, the most sensitive indicators were change in calcium content in the concentrate flow 87 and the Lp. The calcium content of the concentrate flow 87 had the greatest change (from 25 to 18 mM) and the Lp dropped by almost the same factor (from 4 to 3.1 L/m²×h×bar). The induction time can be seen more clearly in FIG. 10 which shows the continuous trace of the Lp calculated from online measurements of flux, pressure, and conductivity during the experiment with 65-72% recovery. The steady state Lp value first begins to drop after a period of time of 17 hours from the beginning of the experiment, and it begins an uninterrupted decline from 22 hour from the beginning of the experiment and onward. Therefore one can take the induction time as occurring sometime within that span.

On examining table 4 and FIG. 10, it is evident that the steady state feed concentration of calcium sulfate for 65-72% recovery before onset of precipitation was only 9 mM. This is the case even though the initial feed composition contained 10 mM calcium sulfate. The discrepancy is caused by the relative low total volume of feed (100 L) and the relatively high holdup volume in the pressure vessels (PV1-PV3) (10-20 L). If the holdup volume in PV1-PV3 and the concentrate return lines is 15 L and the average calcium concentration in PV1-PV3 and concentrate piping is 20 mM (weighted average of feed and concentrate values allowing for concentration polarization and the volume of concentrate piping and fittings downstream of PV1-PV3), then the mass balance generates 8.3 mM as the concentration of calcium in the feed tank at steady state. Clearly, as the volume recovery increases causing the calcium concentration in the concentrate to increase, more of the calcium is in the PV holdup volume causing the feed calcium concentration to drop. This was indeed seen when the recovery was increased to over 80% as shown in the bottom block of table 4. There the steady feed calcium concentration was initially 7.2 mM instead of the original 10 mM.

FIG. 11 shows a trace of the results obtained from an experiment conducted at 82% recovery. As can be seen, while the effective membrane permeability of the PV3 (Lp) appears to drop almost immediately, the calcium concentration only begins to drop after an hour. (The initial concentrate calcium value of 39 mM was measured before attaining the steady state distribution of the salts between feed and concentrate as was discussed hereinabove above.) In FIG. 12, one again can see that the permeate flow rate from the last PV begins to drop almost immediately showing onset of fouling. The momentary stabilization of the permeate flow around 4 hours elapsed time occurred when the applied pressure increasing from 20 to 20.8 bar. The effective membrane permeability was actually dropping even then.

TABLE 4 summary of results of induction time experiment on
pilot unit, 10 mM CaSO$_4$, 20 mM Nacl in feed.

| Recovery | Expt Length hours | Time | [Ca$^{+2}$], mM Feed | [Ca$^{+2}$], mM Conc. | Bulk Sol'n SS Index | VCF | calc | CF$_{expt}$ | $\tau_{ind}$ hour |
|---|---|---|---|---|---|---|---|---|---|
| 65-72% | 45 | Init | 9.1 | 25.4 | 1.8 |  | 2.9 | 2.97 | 17-22 |
|  |  | End | 6.8 | 18.2 |  | 3.4* |  | 2.68* |  |
| 82% | 24 | Init | 7.2 | 37.2 | 2.57 |  | 5.6 | 5.24 | 1 |
|  |  | End | 4.4 | 20.2 |  | 5.4** |  | 4.9* |  |

*This result was calculated at the point of maximum flux drop

Table 4 summarizes the results of induction time experiments. A high recovery results in a high concentration factor and higher super-saturation. As expected, the induction time drops drastically with increased recovery. The occurrence of precipitation can be seen by the drop of calcium in both the feed and concentrate from the beginning to the end of the experiment.

In table 4 the VCF gives the volume concentration factor. This will be equal to the ratio of calcium concentrations in the concentrate and feed, if all of the calcium ion is rejected (actually found to be greater than 99.5%), and none of it precipitates. CF$_{expt}$ gives the actual ratio of measured calcium concentrations in the concentrate and feed. When precipitation occurs at a significant rate, CF$_{expt}$ is lower than VCF (see starred entries). This is so since not all of the calcium that reaches the last PV, actually exits it since part of it precipitates.

Based on the baseline experiment at 82% recovery with 10 mM CaSO$_4$, 20 mM NaCl original feed solution, a reverse flow experiment was conducted. It should be noted that the feed was approximately 1000 L/hour so the concentrate was only 180 L/hour. This is significantly below the manufacturers recommended minimum flow rate (300-350 L/hr) for 2.5 inch spiral elements. In addition, the flux was very high (40-50 L/m$^2$h) even in the last pressure vessel. As a result the concentration polarization on the membrane element at the PV exit was very high (Cw/Cb ~1.45). As a result the super-saturation index at the membrane wall was 2.57×1.45$^2$=5.4 Since the induction time in the baseline experiment was between 0.5-1 hours, the flow was reversed every half hour.

Figure 13:
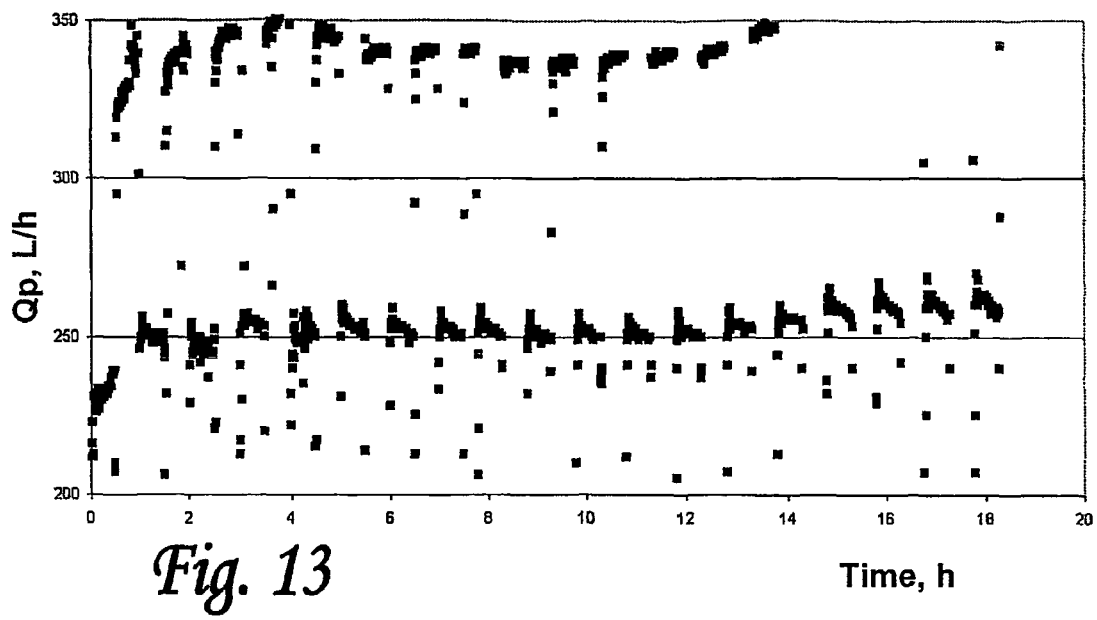
FIG. 13 is a trace showing permeate flow rate from the last pressure vessel as a function of time obtained from a reverse flow experiment operated with calcium sulfate (~8.5 mmol/L in feed tank) at recovery of 0.82 and reversing the flow every half hour.

A trace of the flow from the last pressure vessel PV3 is shown in FIG. 13. The changes in feed flow direction are clearly seen in FIG. 13. When the third pressure vessel was last in the PV series it gave the lower levels of membrane flow, and when it was first in the PV series, during reverse flow, it gave the higher levels of permeate flow. This result follows directly from the fact that when the 3$^{rd}$ PV was last it was exposed to the lowest net driving pressure as both the osmotic pressure of the solution was higher and the applied pressure was the lowest after axial pressure drop. When PV3 was first in the PV series it was exposed to the highest net driving pressure.

As can be seen, the permeate flow 88 is stable both when PV3 is first and when it is last in the PV series. This indicates the use of reverse flow to stabilize flux even when the conditions are extremely super-saturated and the unit is operating outside the manufacturer's recommended limits. Additional proof for the stability obtained with reverse flow is found in comparing table 5 (reverse flow summary) to table 4. Unlike the base case, the calcium level of both feed and concentrate are stable over the experiment duration within 10% of the initial steady state value. In addition the actual concentration factor (CF$_{expt}$) does not decrease over the course of the experiment relative to the volume concentration factor. This shows that almost no calcium sulfate precipitated.

TABLE 5 summary of reverse flow experiment at two different
recoveries, 10 mM CaSO$_4$ and 20 mM in original feed.

| Recovery | Reverse Flow Freq., h$^{-1}$ | Sample Time | Lp | [Ca$^{+2}$], mM Feed | [Ca$^{+2}$], mM Conc | VCF$_{calc}$ | CF$_{expt}$ | $\tau_{ind}$ hour |
|---|---|---|---|---|---|---|---|---|
| 71-73% | 1 | Start | 3.76 | 8.4 | 26.2 | 3.6 | 3.13 | induction |
|  | 1 | End | 3.62 | 7.8 | 32 | 3.5 | 4.1 | time was |
| 80-82% | 2 | Start | 3.87 | 7.5 | 34.2 | 4.69 | 4.56 | not |
|  | 2 | End | 3.77 | 7.2 | 34.2 | 4.94 | 4.75 | reached in these expts. |

EXAMPLE 3

The following synthetic solution was prepared to simulate a potentially scaling feed:
CaCl$_2$: 2.5 mmol/L
NaHCO$_3$: 5 mmol/L
NaCl: 5 mmol/L
in a volume of 150 L. The pH was adjusted to pH 7.2 with HCl requiring 16.7 mg/L. This solution has a calculated LSI of 0.04 (equivalent to a super-saturation ratio of 10$^{0.04}$=1.1). The calcium ion concentration for this solution will be 100 mg/L.

This solution is fed to the reverse flow unit shown in FIG. 8 at a flow rate of 1000 L/min and 700 L/min of permeate were removed through the RO membranes 84. This unit contains three pressure vessels in series, PV1, PV2 and PV3, each of which comprises two ESPA 2540 (2.5 in diameter, 40 inch long) spiral wound low pressure RO elements, wherein the membrane area of each membrane element is about 2.6 m². This results in an average flux of 45 L/m²–h. The permeate flow 88 and concentrate flow 87 are returned to the feed tank (not shown) so that the composition of the feed flow 89 remains constant. Since the feed flow 89 is near saturation, it can be assumed that no bulk precipitation will occur in the feed tank during the course of the experiment. Therefore changes in calcium level should be attributed to deposition in the membranes 84 or the piping system carrying flow concentrate 87 back to the feed tank.

Using the IMS membrane performance projection program of Hydranautics, Inc., one finds that the composition in the concentrate 87 will be 331 mg/L Ca2+, 732 mg/L Na+, 865 mg/L HCO$_3$, and 1215 mg/L Cl—. The calculated LSI will be 1.51 (saturation ratio of $10^{1.51}$=32).

When calcium carbonate begins to precipitate a drop in the dissolved calcium level is anticipated in the feed flow 89 or in the concentrate flow 87. Therefore following the calcium in the feed solution can determine when precipitation begins.

Figure 14:
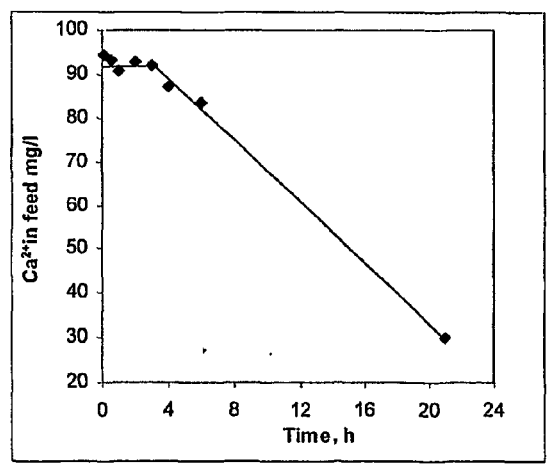
FIG. 14 is a trace showing the results obtained when the system illustrated in FIG. 8 was run without flow reversal using a solution of calcium bicarbonate and NaCl as described in example 3.

FIG. 14 is a trace showing the results obtained when the system illustrated in FIG. 8 was run without flow reversal. As can be seen a significant drop occurs after 4 hours, with the feed calcium level dropping to 30 mg/L after 21 hours.

A further examination of FIG. 14 reveals that the steady state feed concentration of calcium ion before onset of precipitation was only 91 mg/L. This is the case even though the initial feed composition contained 100 mg/L of calcium ion. The discrepancy is caused by the relative low total volume of feed (150 L) and the relatively high holdup volume in the pressure vessels (10-20 L). If the holdup volume in the pressure vessels and the concentrate return lines is 12 L and the average calcium concentration in the pressure vessels and concentrate piping is 197 mg/L Ca2+ ion (weighted average of feed and concentrate values allowing for concentration polarization and the volume of concentrate piping and fittings downstream of pressure vessels), then mass balance generates 91 mg/L as the concentration of calcium ion in the feed tank at steady state. If one recalculates the feed composition based on this steady state value of calcium ion, one finds that the LSI for the steady state feed composition is –0.04 (saturation ratio of 0.91).

Clearly, as the volume recovery increases causing the calcium concentration in the concentrate to increase, more of the calcium is in the pressure vessel holdup volume causing the feed calcium ion concentration to further drop. For a recovery of 78.7% one would expect to find only 87 mg/L of calcium ion even without precipitation. The calcium level drops to well below that after 6 hours.

At the end of this experiment the piping network downstream of the membranes was rinsed separately from the membranes themselves. In runs without flow reversal it was found that ~90% of the calcium carbonate deposit was in the membranes and the rest in the downstream piping. The deposit in the back pressure valve downstream of the membranes resulted in increased hydraulic resistance and a drop in the total flow rate leading to the increased recovery (from 68.9-78.7%) over the course of the experiment. In later experiments this problem was solved by leaving valve 83 open for 2 minutes causing the lower concentration feed solution to flush the downstream section. This is only ⅟₃₀ of the cycle time so it does not cause significant loss in recovery. Thus according to a preferred embodiment the bypass-valve is left open over a period of time suitable for preventing precipitation of sparingly soluble salts and minerals in pipes and valves downstream of the pressure vessel.

Figure 15:
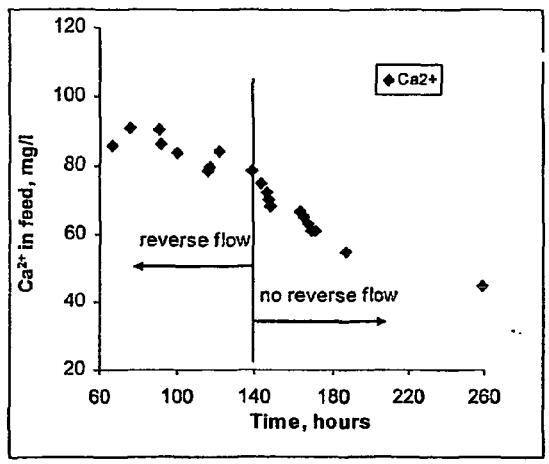
FIG. 15 is a trace showing the results obtained when the system illustrated in FIG. 8 was operated under various conditions.

FIG. 15 is a trace showing the results obtained when reversal was carried out every hour with the 2 minute flushing time for the downstream piping. As shown the calcium level is fairly stable with less than 10% drop in its level over 80 hours.

In order to show that the calcium level stability was primarily due to the reverse flow and not to the extended flushing of the downstream piping, the reverse flow was stopped but the opening of valve 83 for 2 minutes was continued every hour to continue the downstream flushing with a composition near that of the feed water. The results are shown in the second part of FIG. 15. As can be seen as soon as reverse flow was stopped the calcium level began to drop rapidly (losing 22% of its initial value in 30 hours and 30% of its initial value in less than 50 hours).

EXAMPLE 4

Various Procedures for Determining the A and B Constants Required for the Estimation of the Induction Times Method A
1. Take a solution with the feed composition of the feed to be treated in the actual plant.
2. Use a membrane process (e.g. RO) to concentrate it to various recoveries, Y, giving volume concentration factors, VCF=1/(1–Y), so that the bulk concentration of the sparingly soluble salt will reach a defined supersaturation ratio:

$$S_b = \frac{a_M^{v+} a_X^{v-}}{K_{SP}} \text{ for salts } M_{v+}X_{v-} \text{ or } S_b = \frac{C_b}{C_{sat}} \text{ for neutral species}$$

Where M and X indicate the cation and anion, respectively and v indicate their valency; the subscript b refers to the bulk solution composition and $C_{sat}$ refers to the saturation concentration for minerals that do not dissociate into ions for the defined composition of the concentrated feed solution and $a_i$ refers to the activity of ion species i and is related to the concentration of that species $C_i$ by the activity coefficient $\gamma_i$ by: $a_i=\gamma_i*C_i$ where standard equations known to those versed in the art are used to evaluate the activity coefficients. Alternatively the supersaturation ratio can be calculated using standard software programs such as Minteqa2 provided by the U.S. EPA.
3. Then recirculate the concentrated feed continuously past the type of membrane to be used in the plant where such membrane can be in its commercial housing (e.g. spiral element) or as a flat sheet sample. This should be done at a constant pressure, temperature and flow rate. The permeate should be returned to the feed tank. For such a set of conditions, the membrane will pass a permeate flux, Jv, from which the wall composition with respect to the species, i, of the sparingly soluble mineral can be calculated based on the well known concentration polarization equation:

$$\frac{C_{i,w} - C_{i,p}}{C_{i,b} - C_{i,p}} = \exp\left(\frac{J_V}{k_{i,d}}\right)$$

Where $k_{i,d}$ is the mass transfer coefficient for the species i, defined by the hydrodynamics of the housing or flow cell in which the membrane is housed and the diffusion coefficient of species i, and can be readily calculated or measured by those skilled in the art.

The supersaturation ratio at the membrane wall, $S_W$, is then calculated from:

$$S_W = \left(\frac{C_{i,w}}{C_{i,b}}\right)^{v^+ + v^-} \quad 5$$

4. Measure the time until some evidence is obtained that precipitation has begun such as:
   a) drop in the steady state concentration of sparingly soluble mineral species in the feed tank,
   b) appearance of turbidity in the concentrate stream returning to the tank.
   c) drop in the flux Jv of the membrane
   This will be the induction time for the given conditions. So a pair of points $(S_w, \tau)$ has been determined.
5. Repeat steps 3 and 4 for different values of applied pressure, and recycle flow rate to generate different values of wall concentration and wall supersaturation ratios in order to generate k new pairs of points $(S_w, \tau)_1, \ldots, (S_w, \tau)_k$. If necessary the membranes should be cleaned of any deposit from the previous precipitation test (if commercial membrane elements are used). If small flat sheet membrane samples are used, they can either be cleaned or replaced.
6. Repeat steps 2-5 for a different value of recovery, $Y_j$, to give a different volume concentration factor, $(VCF)_j$ and generate more points $(S_w, \tau)$.
7. Then plot the points of $\ln(\tau)$ vs. $1/[\ln(S_w)]^2$. The slope of this line will give A and the intercept will give B.
8. The procedure of 2-6 should yield at least three points in order to perform the analysis in 7.
9. To calculate for other temperatures, tabulated energies of activation for nucleation can be used when available or several measurements taken under similar conditions and the results analysed using the Arrhenius equation to extract the energy of activation for nucleation.

Methods B and C relate to alternative means of obtaining supersaturated solutions to that means described in step 2 above.

Method B:

Instead of concentrating a batch of feed solution as described in step 2 above, a train of membrane desalination (RO or NF) elements in series such as those to be used in the actual process can be used to concentrate a volume of feed solution in recycle mode so that the concentrate stream leaves the last membrane element at the desired bulk concentrate concentration. The concentrate stream and permeate stream are returned to the feed tank (As described in Example 2 hereinabove). Steps 3-5 are then carried out as described above. However in this case each time the pressure and recycle rate are changed in step 3, the recovery rate is automatically changed as well as has previously been described. Data is analysed as described in steps 7-9.

Method C:

If the test is conducted at the site where the feed water is available, a train of membrane elements in series can be used to concentrate the feed stream to a given recovery and then monitor induction time according to criteria b) or c) in step 4 above. Otherwise the procedure will be as in method B.

Figure 7:
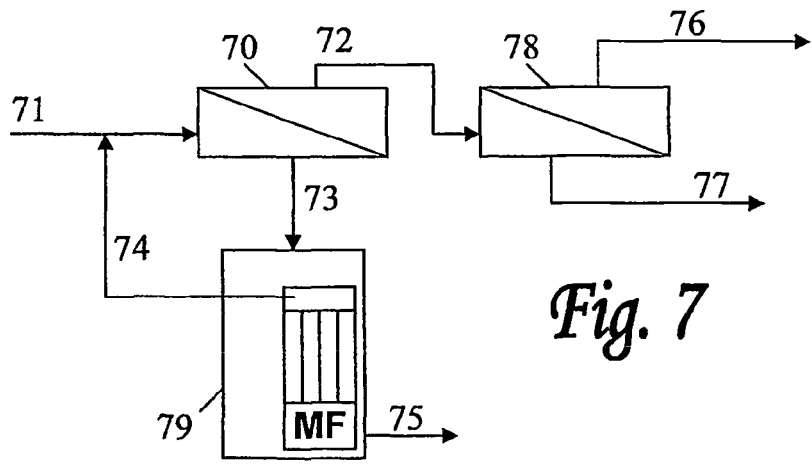
FIG. 7 is a block diagram demonstrating a process for significantly increasing recovery in desalination processes.

FIG. 7 is a block diagram demonstrating a process for significantly increasing recovery in desalination processes without excessive use of additional chemicals. This process can be used with feeds of brackish water, treated wastewater, industrial water and seawater, and particularly whenever there are problems in which recovery limitations are imposed due to sparingly soluble salts. The process shown in FIG. 7 involves three main steps:

a) Preconcentration: this step involves concentrating ions of sparingly soluble salts by a membrane process 70 (e.g., NF or RO), which reject the multivalent ions of sparingly soluble salts which are mainly alkaline earth metals (Ca, Sr, Mg, Ba) and sulfate. This step is preferably carried out utilizing the flow reversal scheme of the invention as exemplified and discussed hereinabove with reference to FIGS. 1-6 and 8-15. If the membrane process 70 is a NF membrane and the salinity of the permeate flow 72 is still too high, the permeate 72 can be sent to a further desalination process 78, such as a membrane process (e.g., RO or electrodialysis) or a thermal process (e.g., multistage flash, multiple effect desalination, vapor compression, distillation, membrane distillation) to generate a product water 76 of requisite quality. This further desalination process 78 can also be a combination of any of the processes mentioned herein in order to increase recovery (e.g., RO followed by a thermal evaporation process or electrodialysis). However, if the membrane process 70 is a RO process, the permeate 72 can usually be used as desalinated product water.

b) Precipitation: in this step the super-saturated concentrate 73 from the preconcentration step a) is sent to a vessel 79 containing a suspension of solids, such as sand grains or calcium carbonate or calcium, which act as seeding surfaces wherein precipitation occurs thereon. The excess concentration of the super-saturated salts in concentrate 73 is released by precipitation on the seed surfaces in vessel 79. The solution obtained in vessel 79 is close to saturation and is preferably separated from the suspension by filtration on a Microporous Filter (MF). Alternatively, the super-saturated concentrate 73 can be fed to the top (or bottom) of a fixed or moving bed of seed solids (not shown) such as is well known in the art of precipitation softening (lime or soda softening) and the softened solution is removed from the bottom (or top) of the bed after equilibrating to the equilibrium concentration of the sparingly soluble salts. As a further alternative, the supersaturated concentrate 73 can be fed to an electrolytic softener which generates the base needed to further precipitate an increased part or all of the remaining calcium ion by the cathode reaction during electrolysis (e.g., Rinat, J., Korin, E., Soifer, L. and A. Bettelheim, J. of Electroanalytical Chemistry, in press (2004).

c) Further desalination (optional): in this step the separated product, flow 74, obtained from the suspension in step b)—which is now nearly at equilibrium with respect to sparingly soluble salts—is fed back to the feed 71 or to an intermediate stage in the membrane process 70 in step a). Alternatively, flow 74 can be fed to an additional desalination step (e.g., membrane or thermal desalination) (not shown) with a small amount of antiscalant, which will require a smaller volume to be processed.

As described hereinabove, the preconcentration process 70 is preferably implemented utilizing either RO which substantially retains all ions, or NF which retains multivalent ions and partially passes monovalent ions. In the case of a NF process, the rejections for the multivalent cations will usually be better than 80-90% and the rejection for sulfate will be better than 95%. For RO the rejection of multivalent cations will usually exceed 99%.

The concentrate flow 73 leaving membrane process 70 will normally have a super-saturation ratio in excess of 2.0 in all sparingly soluble salts. If the feed is not acidified the feed will often have a LSI>2 for calcium carbonate super-saturation.

The seeded crystallizer unit 79 can be in the form of a vessel containing the seeds kept in suspension by agitation, or a fluidized bed, or fixed bed, or another form familiar to those versed in the art of precipitation lime softening—including but not limited to embodiments such as an upflow solid contactor clarifer (vessel with suspension) or a spiractor (fixed or fluidized bed contactor), and membrane aided crystallizer. The crystallizer 79 is preferably a type of crystallizer in which the solids formed are compact and not voluminous as in the case of clarifiers. Therefore, packed and fluidized beds and membrane aided crystallizers will be preferred because of their ability to get a compact deposit for removal.

The seeds in the crystallizer 79 can be seeds of the sparingly soluble salts (e.g., calcium carbonate or calcium sulfate) or fine sand (e.g., 0.1-2 mm in diameter with sand often to be preferred in packed and fluidized beds). If seeds in an agitated suspension are used, a charge of 1-10% (wt/vol) has been found effective in the case calcium carbonate precipitation. Solids separation can be effected by gravity (in case of clarifiers, or fluidized beds) or a membrane barrier. Where membranes are used to separate the near saturated water from the suspension of the crystallizer, any membrane can be used with pore sizes less than ~10 μm, if a filter cake of the crystalline solids is allowed to form on the membrane. If no filter cake is formed on the membrane, then it is preferred to use membranes with pore sizes of 0.2 μm or less.

The membranes can be mounted in the reaction tank of crystallizer 79 and the separation product 74 is preferably removed by suction. Alternatively, the membrane can be mounted on a side recycle stream, forcing the flow 74 through the membrane under positive pressure.

The size of the crystallizer 79 is dependent on the rate of sparingly soluble salt deposition on the seeds. The rate of deposition for sparingly soluble divalent salts is often given by an equation of the form:

$$\frac{dm}{dt} = s \cdot k \cdot (C - C_{sat})^n$$

Where dm/dt is the rate of salt precipitation per unit volume of the reactor, S is the area of seeds per unit volume of the reactor, k is the rate constant for precipitation, C is the concentration of sparing soluble salt, and $C_{sat}$ is the saturation concentration of the sparingly soluble salt. The exponent n, will usually be 2 for a reaction which is reaction limited and 1 for a reaction which is mass transport limited. In any case it is clear that the more super-saturated the concentrate flow 73, its concentration of sparing soluble salt C will be higher and the precipitation rate will be higher allowing a more compact crystallizer. By adding Alum to the crystallizer 79 it may be possible to co-precipitate silica as well. The solids or semi-solid slurry 75 are removed from the crystallizer 79 according to methods known to those well versed in the art of precipitation/lime softening according to the choice of crystallizer equipment used and the solids or semi-solids 75 and they are then sent to disposal.

The flow 74, which is at, or slightly above, saturation with respect to sparingly soluble salts, is returned to membrane process 70 by combining it with the feed flow 71, or with an intermediate flow within membrane process 70. Because it is near saturation and it is of a much smaller volume than flow 71 and assuming that flow 71 is not saturated, the combined streams 71 and 74 will usually not exceed saturation. In the event that flow 71 is near saturation or saturated, a small amount of antiscalant can be added to the combined streams of 71 and 74 in order to obtain an induction time which is long enough to allow flow reversal to be effective. In such a case, because the amount of antiscalant is low (just enough to generate an induction time of 0.25 hours or more), it will usually not seriously impair the operation of the crystallizer 79 where there is a large concentration of seed crystals and super-saturation.

If an RO membrane or tight NF (NaCl rejection>90%) is used in membrane process 70 then the permeate flow 72 can be often used directly. If an open NF membrane is used in membrane process 70 then the permeate flow 72 is fed to another desalination process 78 for further salt removal. Desalination process 78 can be any of the desalination processes known to those versed in the art of desalination and water treatment including membrane processes (e.g., NF, electrodialysis, RO) or thermal desalination processes (e.g., multiple effect distillation mutv-stage flash distillation, vapor compression distillation, membrane distillation). Desalination process 78 may also utilize the flow reversal scheme of the present invention.

In this case, the product flow 76 is taken from desalination process 78 for use and the highly saline brine concentrate 77 is sent for disposal. It should be noted that very high recoveries are attainable in desalination process 78 because of the removal of scaling ions in the NF membrane process performed by membrane process 70. The recoveries expected from desalination process 78 exceeds 50-60% when flow 71 is a seawater feed (>32,000 mg/L) and exceeds 90-95% when flow 71 is a brackish water feed (2000-8000 mg/L).

The advantages of this process are that the precipitation step (b) can take place without the addition of chemicals such as lime, caustic soda or sodium carbonate to generate super-saturation with respect to calcium. In addition, the solids formed on the seeding surfaces in vessel 79 are more easily removed than in the case of the sludges formed in lime softening. Moreover, the concentration step of step (a) already generates the super-saturation required for the precipitation step (b). An additional advantage to this process is that little or no antiscalant is needed since scaling is prevented in the preconcentration step by utilizing the reverse flow scheme of the invention. Therefore there is little or no antiscalant to interfere with the rate of precipitation in the precipitation step (b).

The membranes can be made from any of the accepted membrane materials—including but not limited to thin-film composite membranes made of polyamides or asymmetric membranes made from polyamide or cellulose acetate and its derivatives. The membrane elements can be spiral wound, plate and frame, tubular, or hollow fiber geometry provided that there is an arrangement to allow reversing the flow by switching the streams connected to the feed and reject fitting on the element. In a preferred embodiment of the invention a spiral wound membrane element is used. The preconcentration unit 70 is preferably operated utilizing the flow reversal scheme of the invention to prevent precipitation in the preconcentration step (a).

As was described and exemplified hereinabove, the present invention provides a reverse flow membrane filtration process that can operate under conditions where the composition of the solution next to the active membrane surface temporarily exceeds the effective saturation limit of sparingly soluble salts, while at the same time not allowing such local super-saturation to lead to precipitation fouling of the membrane. The filtration process of the invention also assists to relax design constraints, allow higher recoveries, and reduce brine volumes. It also provides means of achieving substantially high recoveries despite temporarily high local super-saturations. The present invention also includes a system for reversing the flow in a train of RO or NF membrane elements in series, and it is applicable to all geometries of membrane elements, including but not limited to spiral wound, hollow fiber (Internal Diameter (ID) smaller than 3 mm-ID<3 mm), tubular (ID>3 mm), plate and frame geometries familiar to the practitioner of membrane technology. It is also applicable to membrane elements made from all types of materials that can retain sparingly soluble salt species, including but not limited to polymerics (e.g., thin film composites of polyamide, polyureas, asymmetric membranes of cellulosic materials, sulfonated polysulfones, polymeric membranes with acid, base, oxidant and/or solvent stability) and ceramic materials (e.g., zirconium oxide, aluminum oxide, silica, carbon). It also includes a general methodology for changing the flow direction with a frequency that insures that the flow in one direction does not occur for a time exceeding the induction time corresponding to the composition of the high pressure solution at the concentrate end of the flow train.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A pressure-driven membrane system for purifying water containing soluble species capable of forming sparingly soluble salts and/or minerals, comprising at least one pressure vessel having one or more membranes disposed therein; a pressure pump for producing a pressurized water stream; a plurality of controllable valves for controlling the direction of a feed flow and a concentrate flow therein; wherein said system comprises a control unit linked to said valves, wherein said control unit is adapted to provide said valves with control signals for periodically reversing the direction of said feed and concentrate flows via said pressure vessel within determined time periods corresponding to the induction time related to said salts and/or mineral and said one or more membrane, and a crystallizer adapted to receive said concentrate withdrawn from said pressure vessel, for precipitating one or more sparingly soluble salts and/or minerals in said crystallizer.

2. A system according to claim 1, wherein the induction time is estimated by the control unit according to the formula $$\tau = e^{\frac{A}{[\ln(S)]^2} + B},$$

wherein A and B are salt/mineral and membrane related constants and S is the ratio between the maximum actual activity product of a given sparingly salt in the solution next to the high pressure side of the membrane and the thermodynamic solubility product, or, for an undissociated mineral, the ratio of the actual maximum mineral concentration to the saturation concentration of that mineral for the given composition, said ratio being determined by utilizing sensing means linked to said control unit and adapted to provide it with signals corresponding to said actual activity product.

3. A system for purifying water containing soluble species capable of forming sparingly soluble salts and/or minerals according to claim 1, comprising:

a. At least one pressure vessel having one or more membranes disposed therein, said at least one vessel comprising at least a first, second, and third openings wherein said third opening is used for recovering the permeate and is in fluid communication with the interior of said vessel via said membranes;

b. a pressure pump for producing a pressurized water stream;

c. at least a first and a second controllable directional control valves wherein a first port of said first and second valves are connected to each other, a second port of said first valve is connected to said pump, a second port of said second valve is connected to said second opening of said pressure vessel, a third port of said first valve is connected to said first opening of said pressure vessel, and a third port of said second valve is connected to a concentrate exit;

d. at least one two-way controllable bypass-valve for connecting said first opening of said pressure vessel to said concentrate exit; and e. a control unit linked to said valves, wherein said control unit is adapted to provide said valves with control signals for periodically reversing a flow direction via said pressure vessel within determined time periods.

4. A system according to claim 1, wherein the control unit is capable of estimating the induction time using the following equation:

$$\ln(\tau) = \frac{A}{[\ln(S)]^2} + B$$

upon receipt of A and B, said control unit receiving data from at least two sensing devices linked thereto, said sensors being capable of sensing the concentration level of at least one salt in the water stream at the vicinity of the first and second opening of the pressure vessel, and from a permeate and concentrate flow measuring devices, wherein said sensing and measuring devices provide said controller with corresponding signals for calculating S, or said control unit receives the value of S as an input, and thereby estimating said induction time.

5. A system according to claim 1, wherein at least one of the membranes is a spiral wound element.

6. A system according to claim 1, wherein at least one of the membranes is a hollow fiber element having an internal diameter smaller than 3 mm.

7. A system according to claim 1, wherein at least one of the membranes is of a plate and frame geometry.

8. A system according to claim 1 wherein, at least one of the membranes is of a tubular geometry having an internal diameter greater than 3 mm.

9. A system according to claim 1, wherein the crystallizer is in the form of a vessel containing seeds.

10. A system according to claim 1, wherein the crystallizer is in the form of a fluidized bed.

11. A system according to claim 1, wherein the crystallizer is in the form of a fixed bed.

12. A system according to claim 1, wherein the crystallizer comprises membrane barrier mounted therein to allow the separation of the precipitate.

* * * * *